United States Patent
Shu et al.

(10) Patent No.: US 6,185,008 B1
(45) Date of Patent: Feb. 6, 2001

(54) MULTILEVEL SCREENING FOR COLOR LASER PRINTER

(75) Inventors: Joseph Shu, San Jose; Andrei Pascovici, Palo Alto; Chia-Hsin Li, San Jose, all of CA (US)

(73) Assignee: Seiko Epson Corporation, Tokyo (JP)

( * ) Notice: Under 35 U.S.C. 154(b), the term of this patent shall be extended for 0 days.

(21) Appl. No.: 09/430,419

(22) Filed: Oct. 29, 1999

Related U.S. Application Data

(62) Division of application No. 08/938,927, filed on Oct. 2, 1997, now Pat. No. 6,097,502.
(60) Provisional application No. 60/032,551, filed on Dec. 18, 1996.

(51) Int. Cl.[7] .............................. H04N 1/405; H04N 1/393
(52) U.S. Cl. ............................. 358/1.9; 358/1.2; 358/457; 358/458; 358/459
(58) Field of Search ............................. 358/1.9, 1.2, 534, 358/459, 458, 457, 456, 298, 451; 382/237, 270, 299, 298

(56) References Cited

U.S. PATENT DOCUMENTS

| | | |
|---|---|---|
| 4,878,068 | 10/1989 | Suzuki . |
| 4,916,545 * | 4/1990 | Granger ............................ 358/456 |
| 4,926,248 | 5/1990 | Kobayashi et al. . |
| 4,987,426 | 1/1991 | Ota et al. . |
| 5,353,387 | 10/1994 | Petschik et al. ...................... 358/1.9 |
| 5,463,720 * | 10/1995 | Granger ............................ 358/456 |
| 5,469,268 | 11/1995 | Neuhoff et al. . |
| 5,493,324 | 2/1996 | Goto et al. . |
| 5,495,278 | 2/1996 | Oda et al. . |
| 5,568,572 | 10/1996 | Shu ............................... 382/260 |
| 5,633,729 | 5/1997 | Smith et al. . |
| 5,745,260 * | 4/1998 | Blazey ............................ 358/456 |
| 5,809,213 | 9/1998 | Bhattacharjya . |

* cited by examiner

Primary Examiner—Scott Rogers

(57) ABSTRACT

Tone reproduction of an image is improved by the use of error diffusion or dithering in the mapping of input pixel values on an input values scale to printer pixel values on a printer values scale, where the input values scale and the printer values scale both have more than two levels, to generate an image where a spatial average of printer values approximates a spatial average of the corresponding input values, as measured on the printer values scale. To improve the tone reproduction of reduced-resolution images, the printer pixel values are grouped into multi-pixel cells, printer pixel values within each cell are mapped to a font index value, and a font cell corresponding to the index level is printed at the location of the cell. The font set is chosen such that differences in total deposited ink between consecutive font cells is minimized. In the font cell having a font index value of zero all printer pixel values are zero, in the font cell having a font index value of one all printer pixel values are zero except for a single pixel having an isolated-single-pixel cutoff value, and as the font index value of subsequent font cells is incremented a printer pixel value is incremented such that all printer pixel values are zero except for pixels in a line along the scan direction. The final font cell consists of a line of pixels along the scan direction having a full-cell-width printer pixel value, and pixels of zero value elsewhere. The dynamic range of the font set is extended by a linear remapping of font index values.

21 Claims, 16 Drawing Sheets

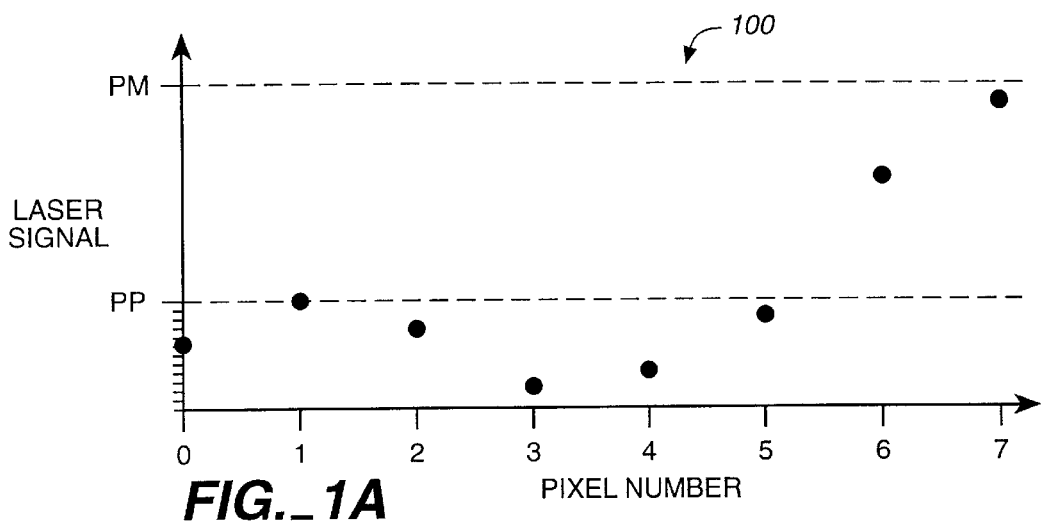
FIG._1A
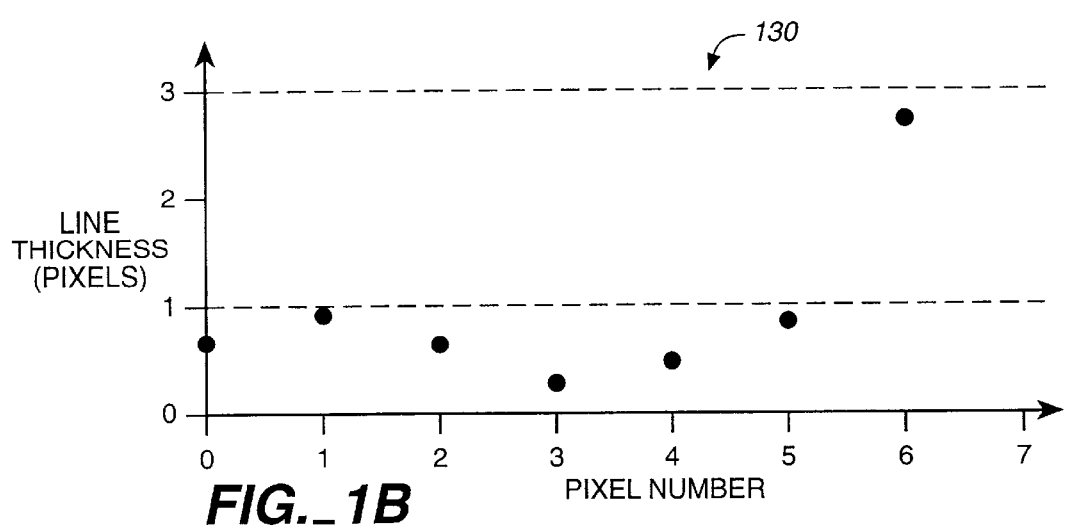
FIG._1B
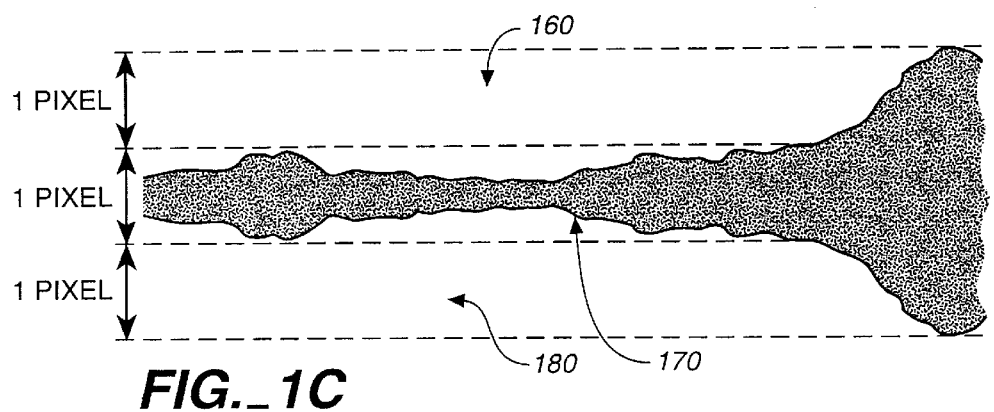
FIG._1C

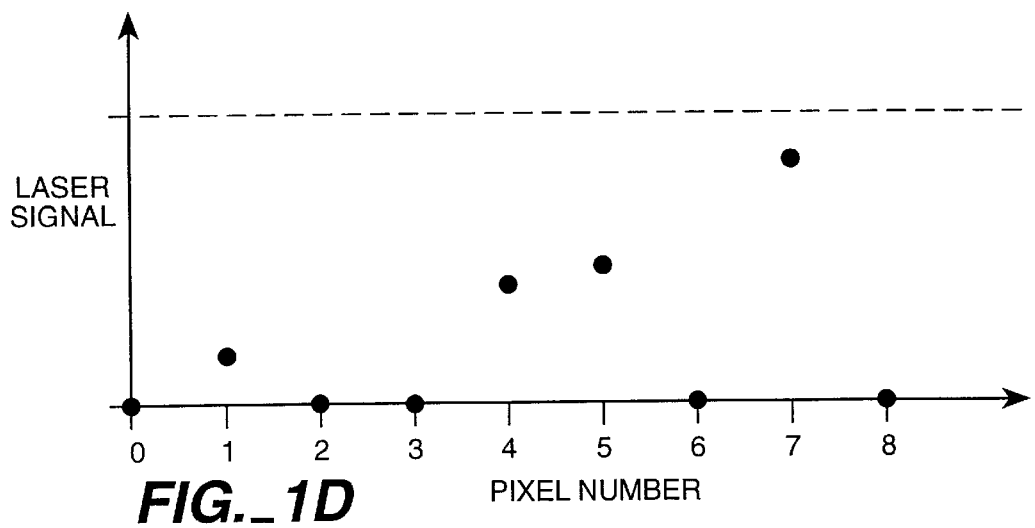
FIG._1D
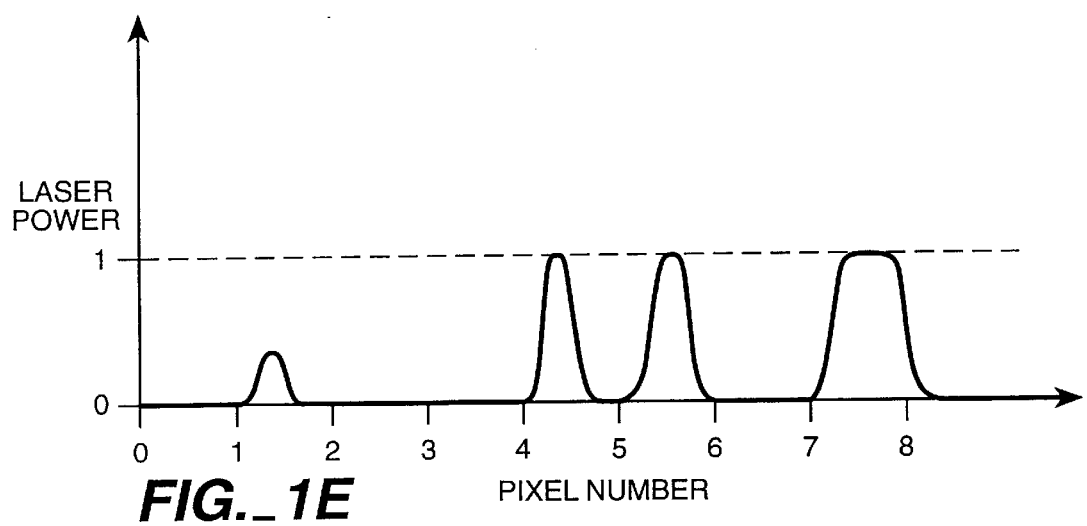
FIG._1E
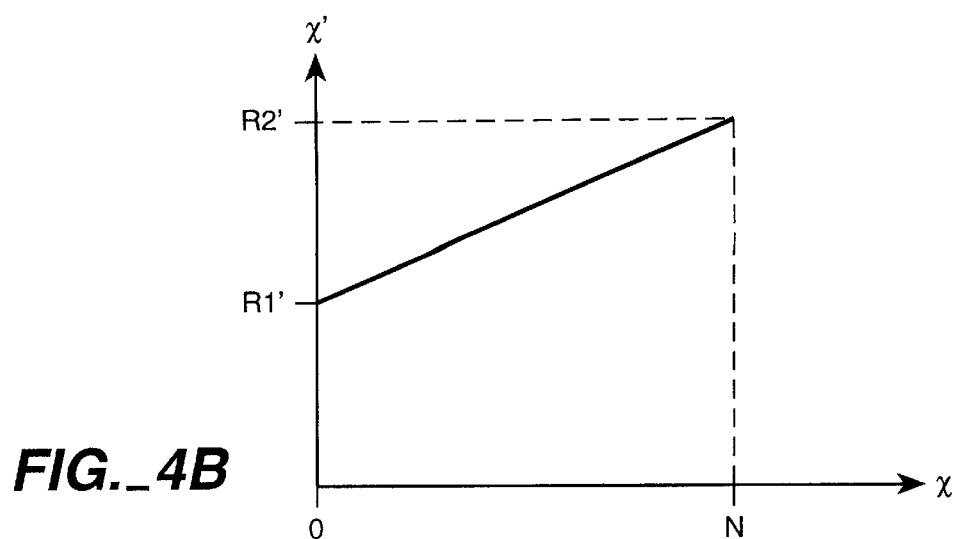
FIG._4B

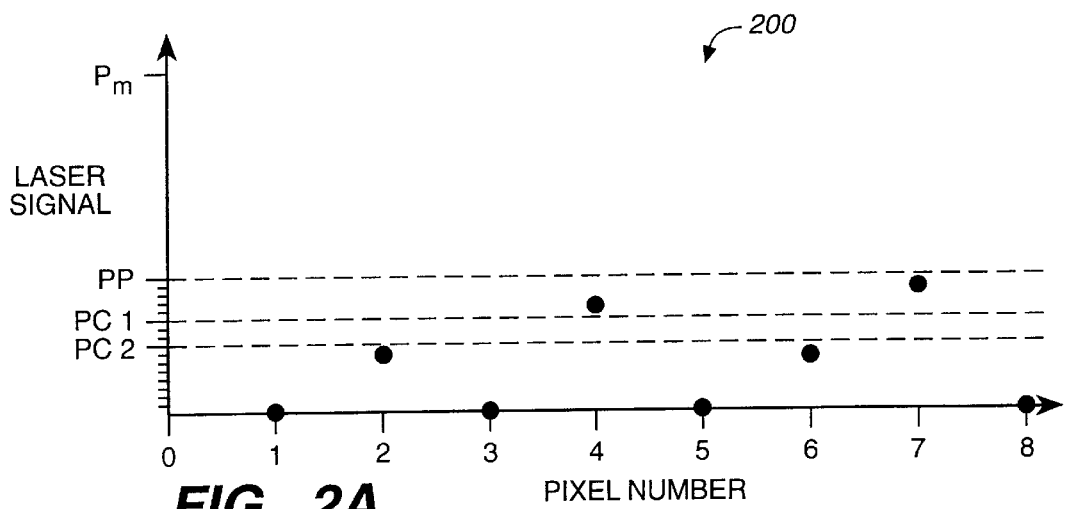
FIG._2A
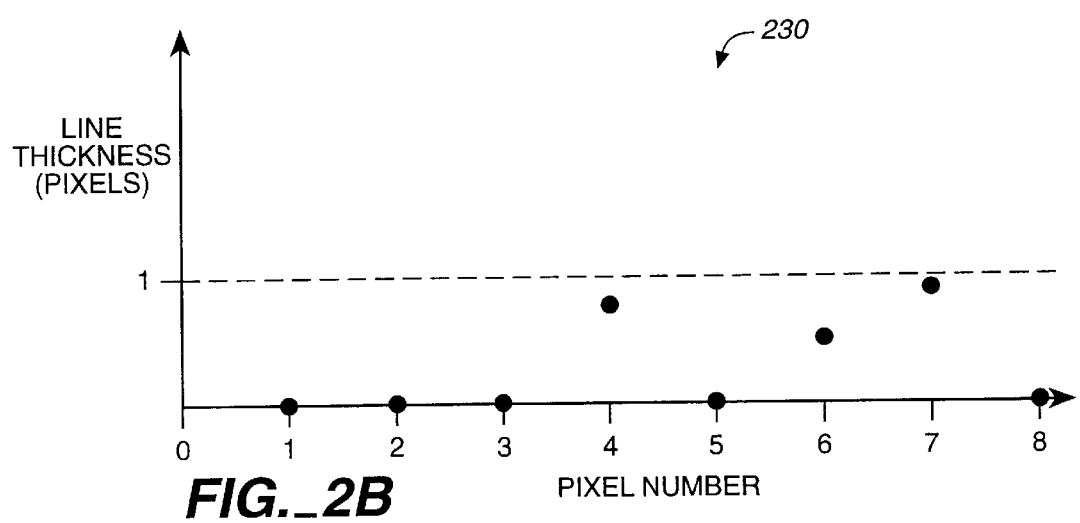
FIG._2B
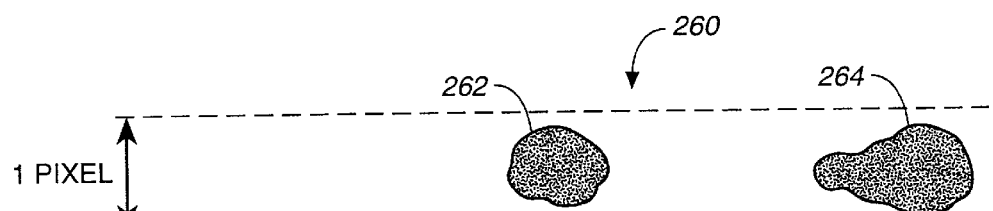
FIG._2C

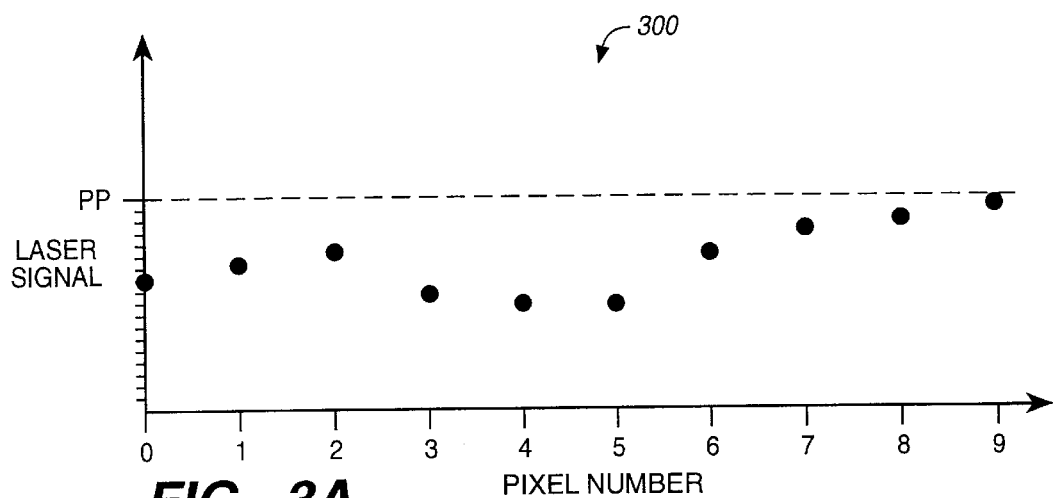
FIG._3A
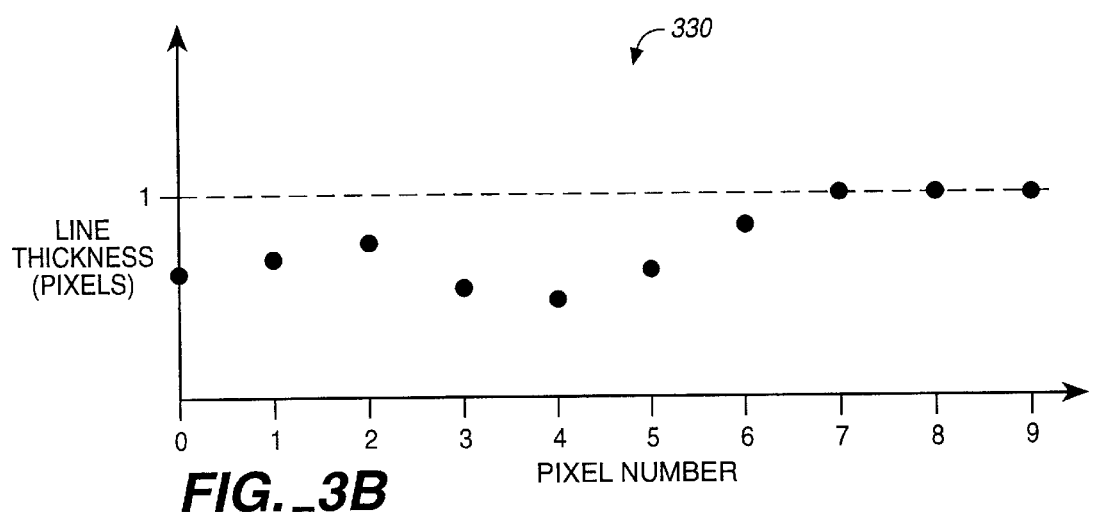
FIG._3B
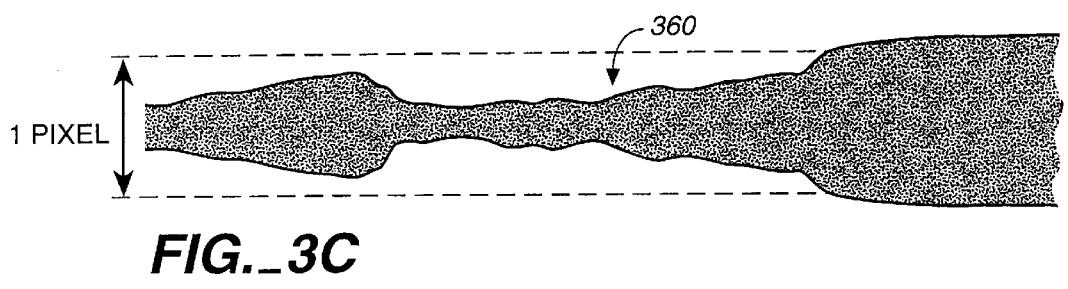
FIG._3C

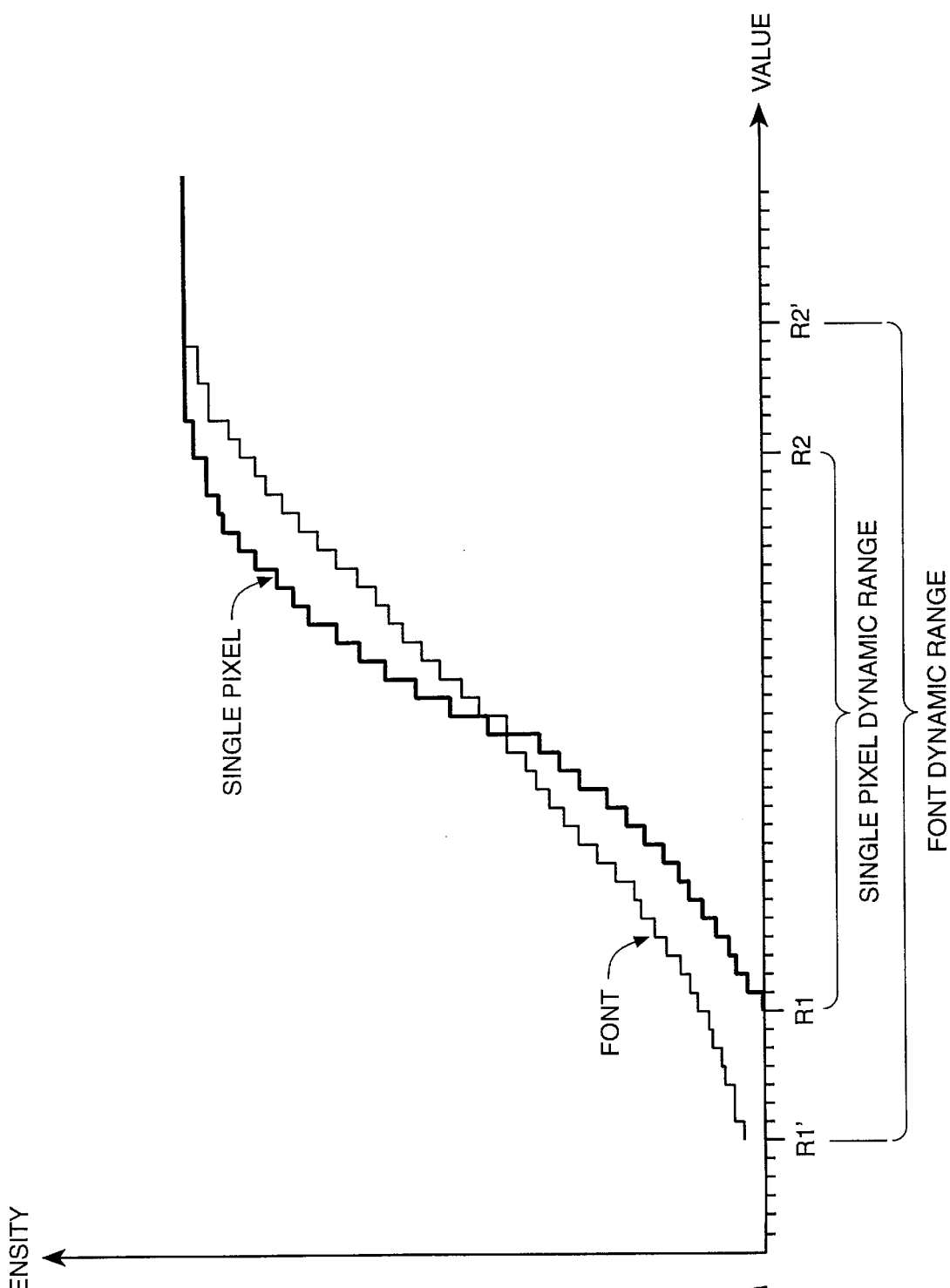

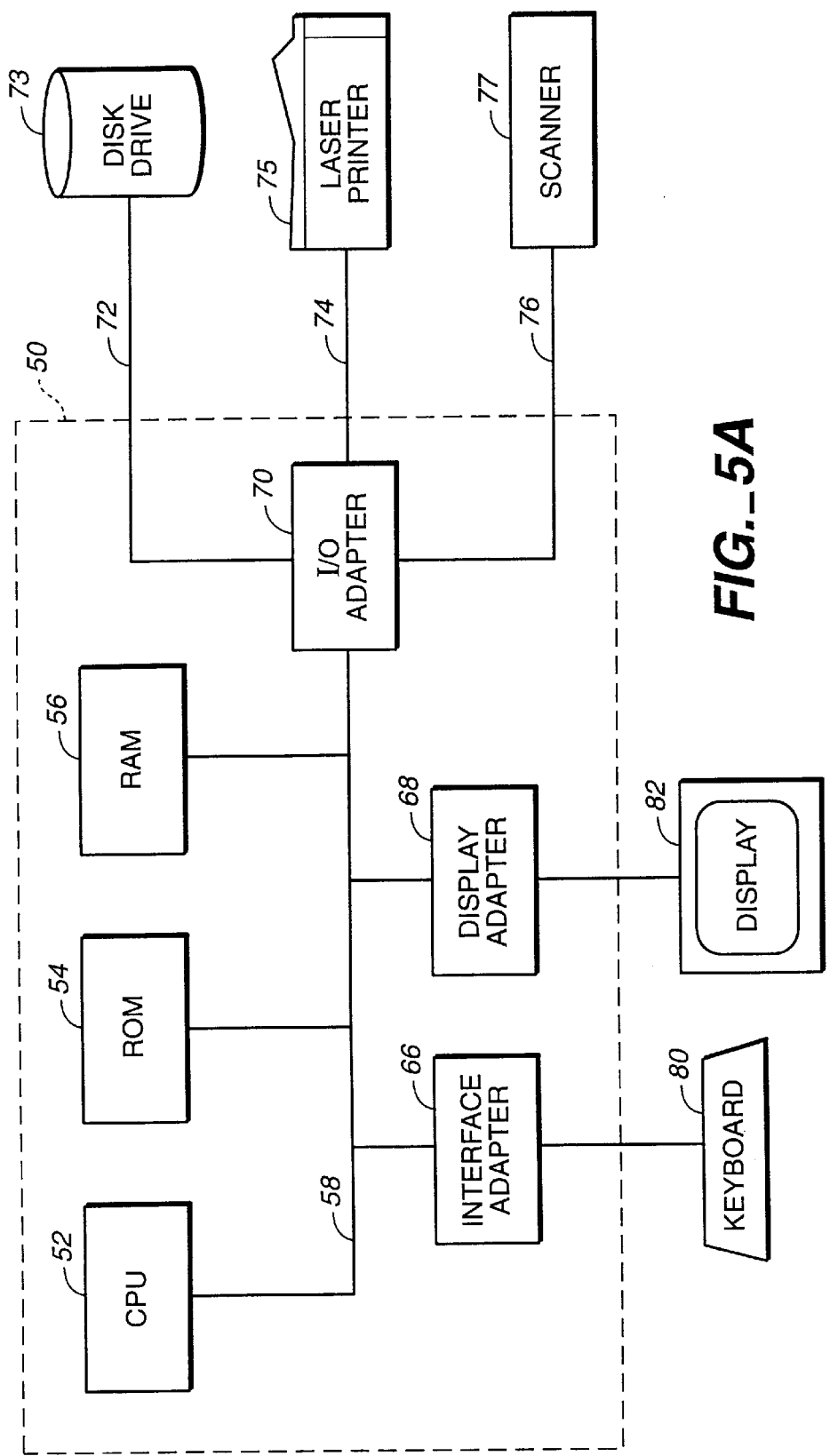
FIG._5A

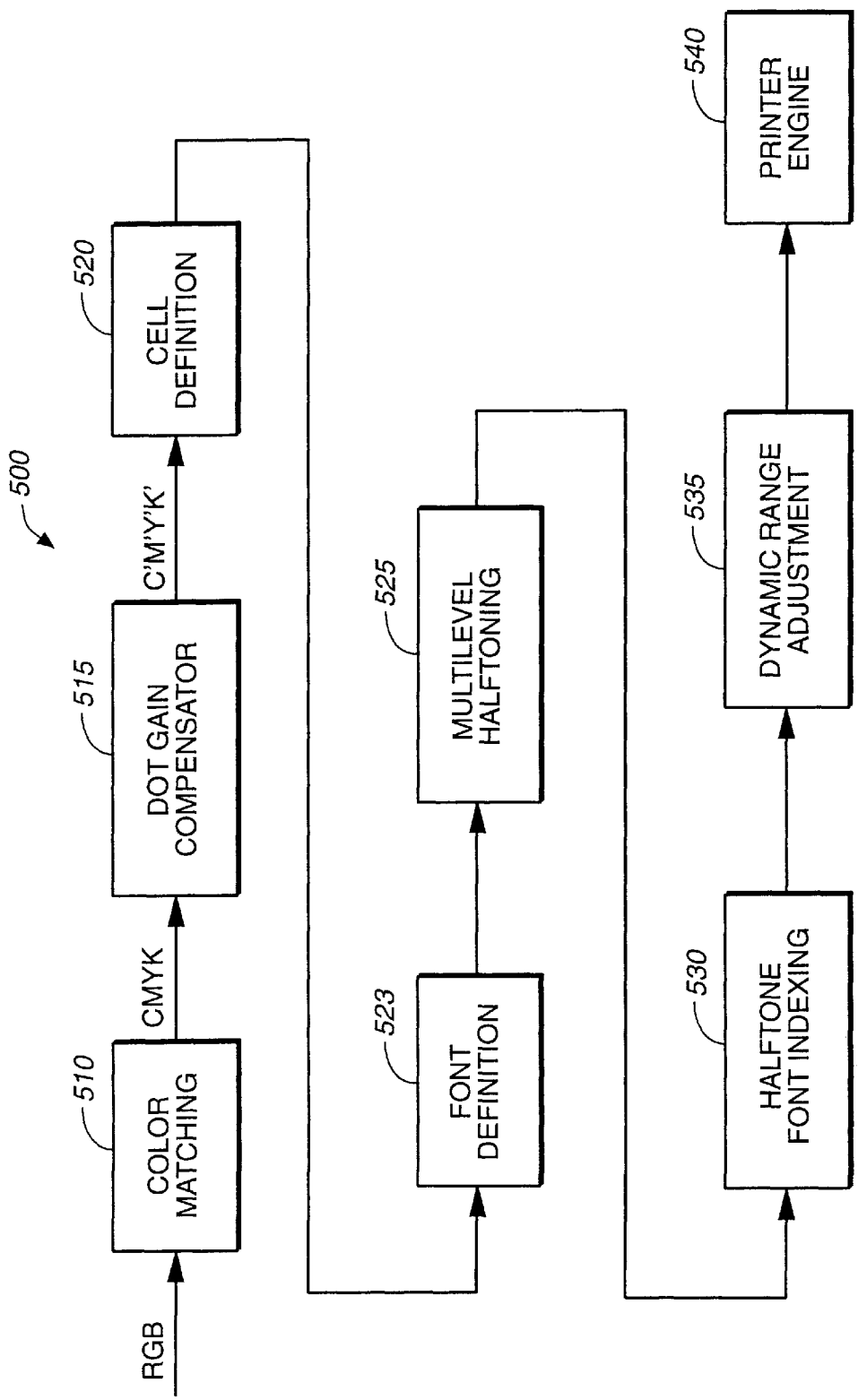
FIG._5B

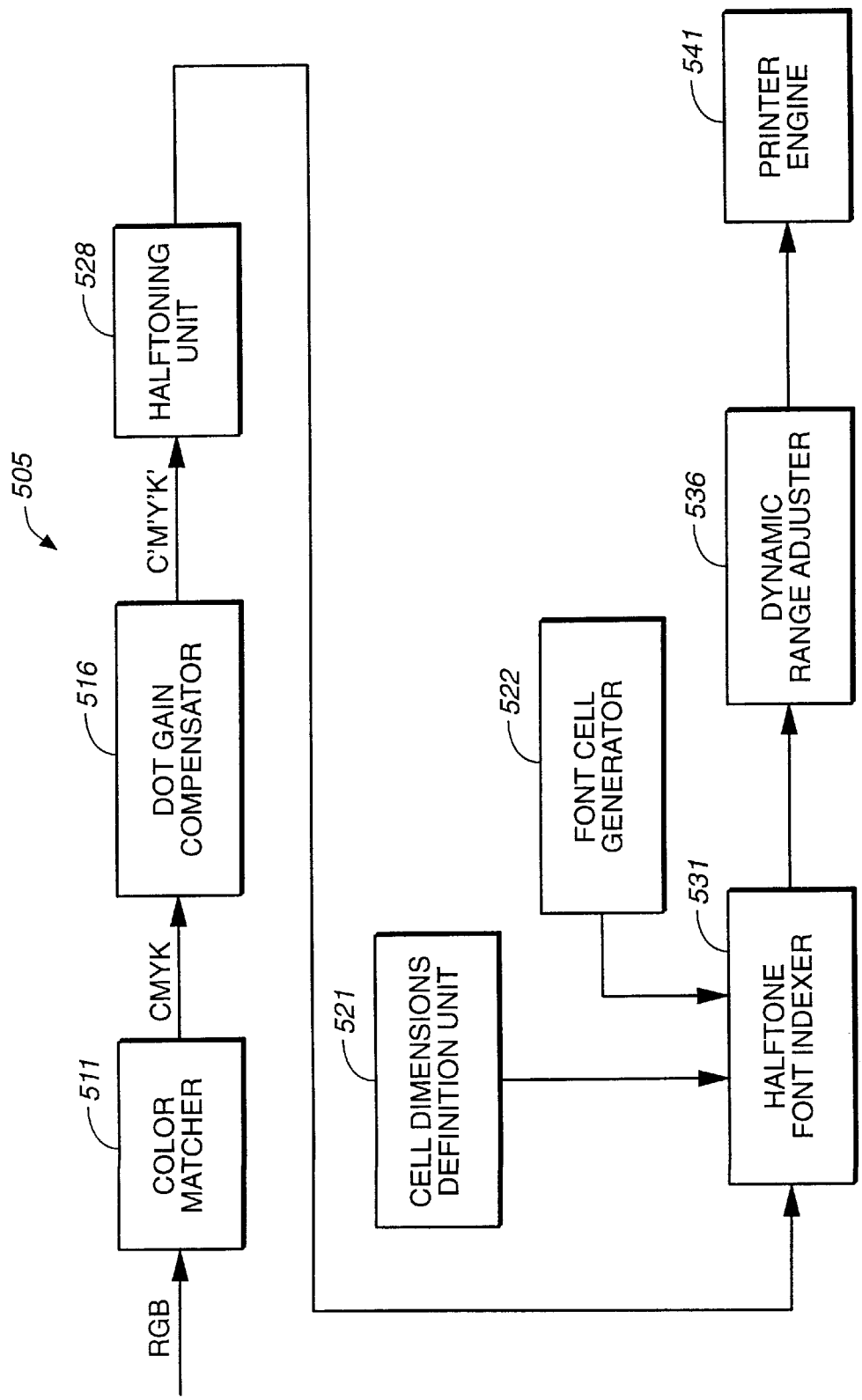

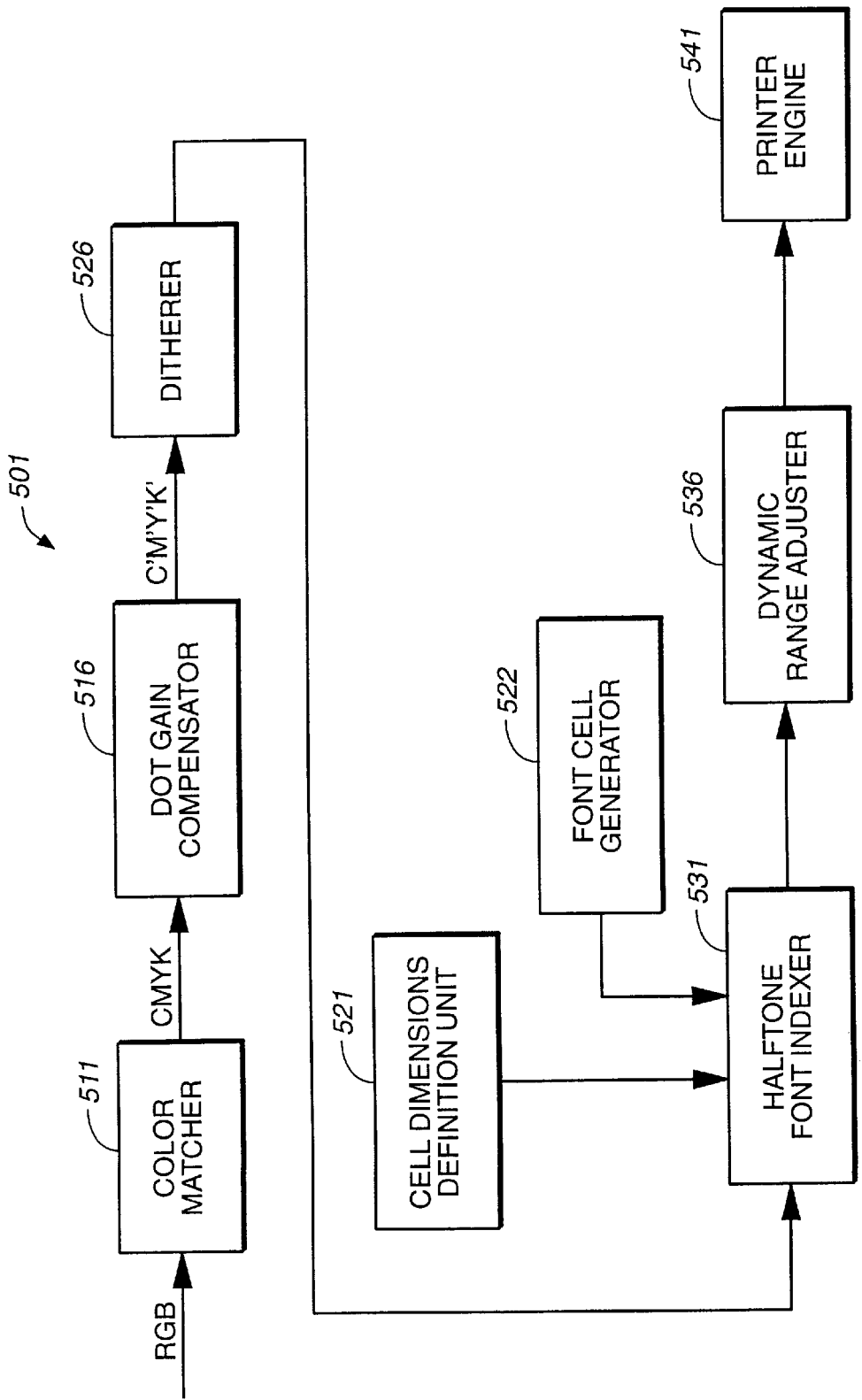
FIG._5D

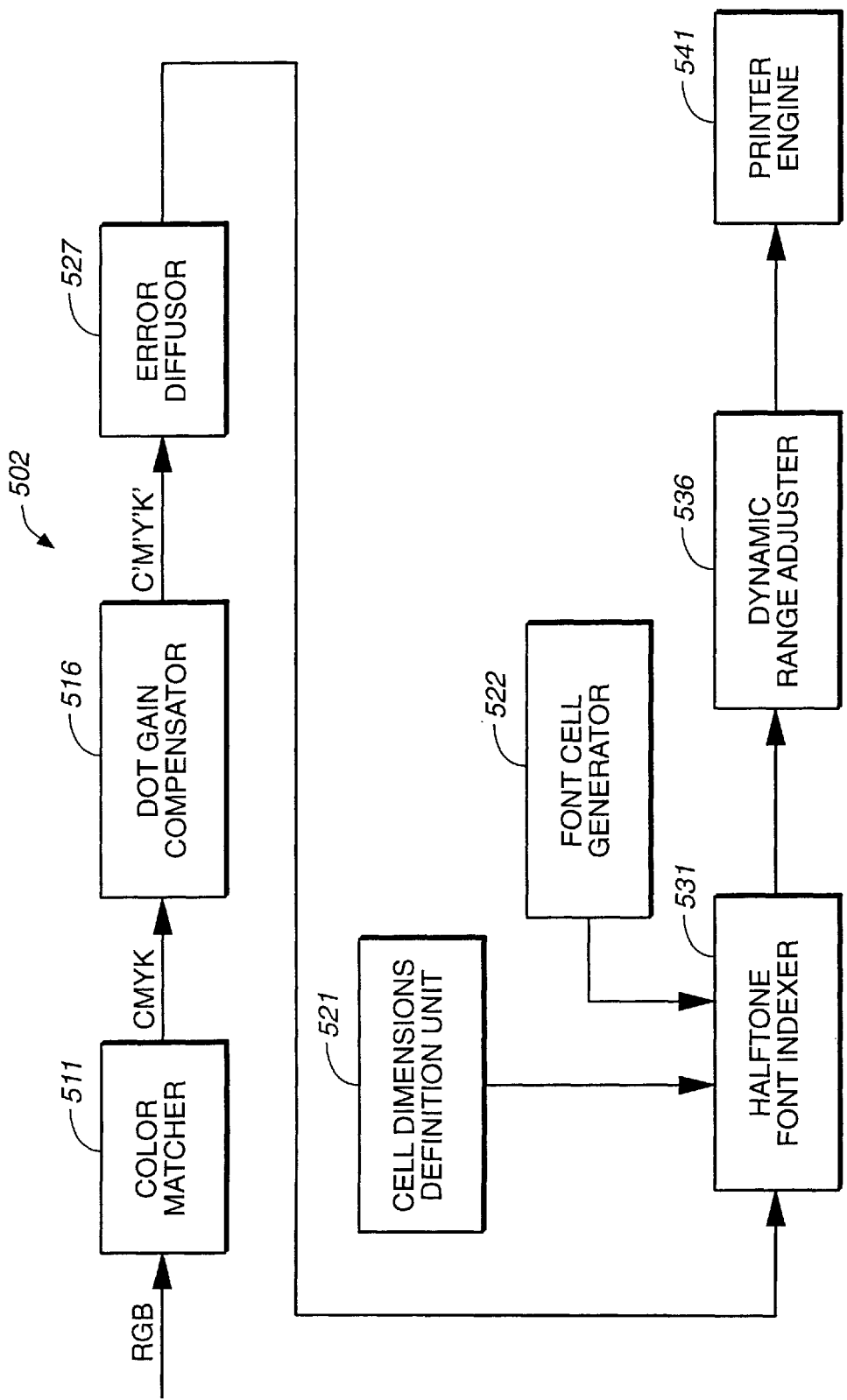
FIG._5E

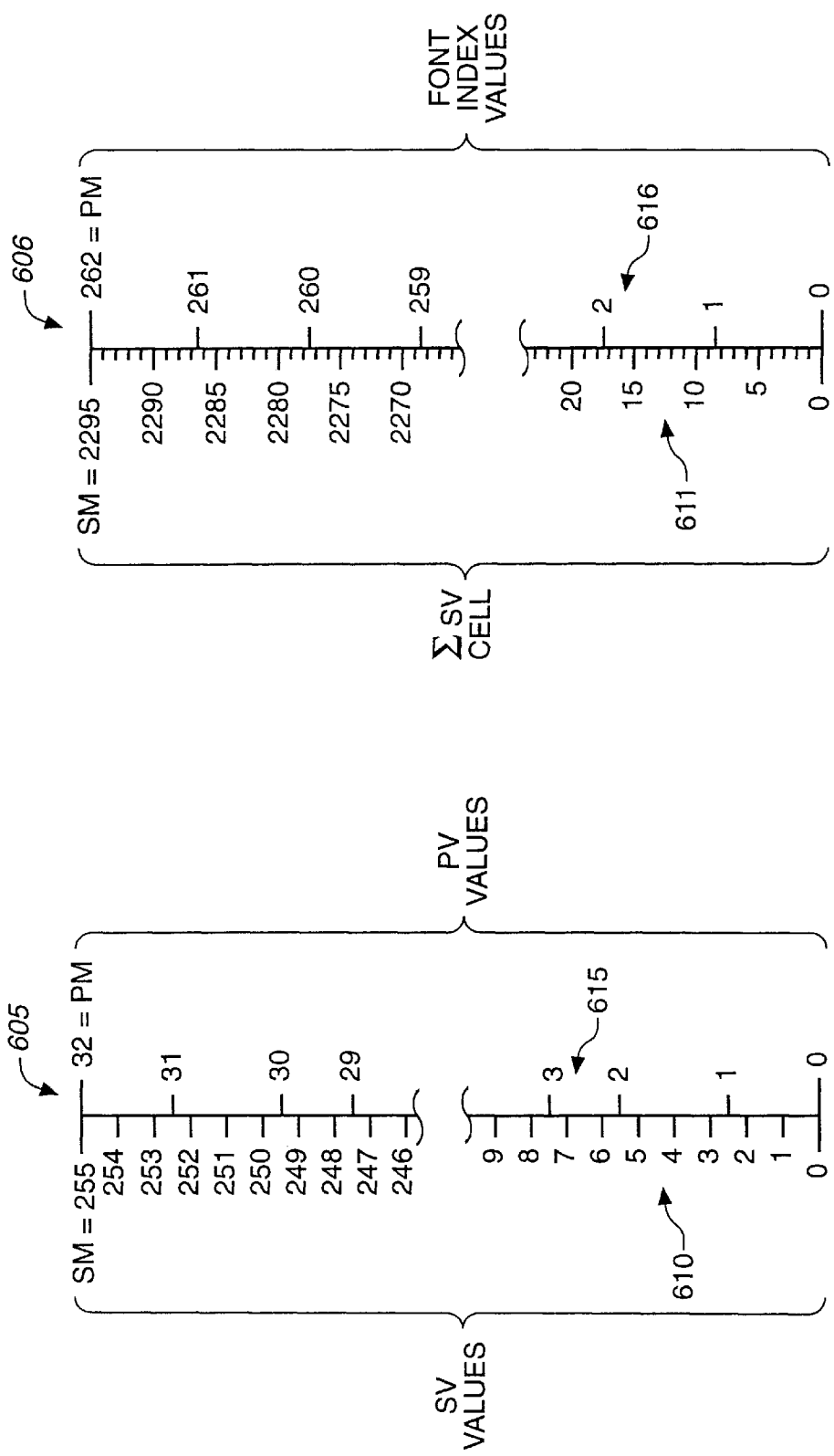

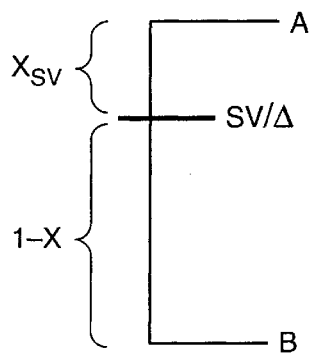
FIG._6C
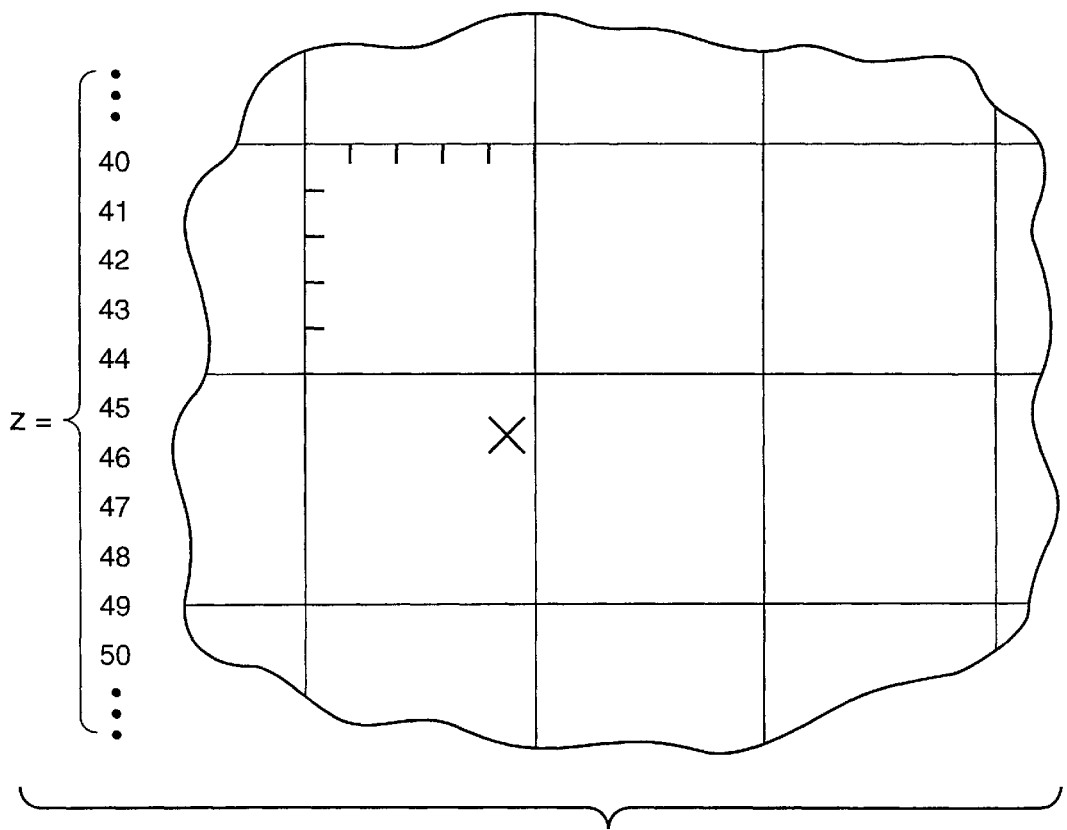
FIG._7A
FIG._7B

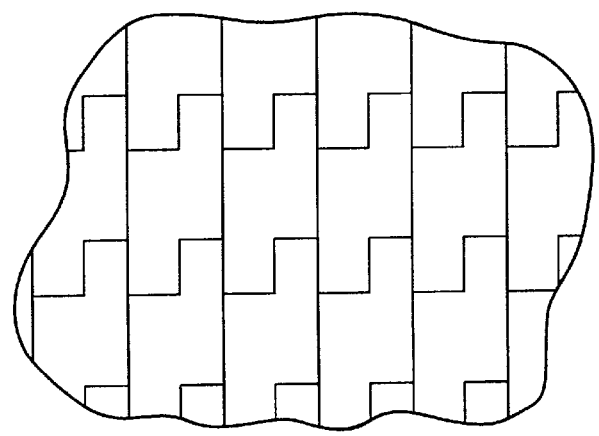
FIG._7C
| 10 | 0  | 0  |
|----|----|----|
| 0  | 10 | 10 |
| 0  | 0  | 0  |
| 9  | 0  | 11 |
| 0  | 6  | 0  |
| 0  | 5  | 0  |
| 0  | 0  | 6  |
| 10 | 0  | 3  |
| 0  | 11 | 2  |
FIG._9A
| 0 | 0  | 0 |
|---|----|---|
| 0 | 30 | 0 |
| 0 | 0  | 0 |
| 0 | 0  | 0 |
| 0 | 31 | 0 |
| 0 | 0  | 0 |
| 0 | 0  | 0 |
| 0 | 32 | 0 |
| 0 | 0  | 0 |
FIG._9B x = 0

| 0/32 | 0/32 | 0/32 |
| --- | --- | --- |
| 0/32 | 0/32 | 0/32 |
| 0/32 | 0/32 | 0/32 | x = 1

| 0/32 | 0/32 | 0/32 |
| --- | --- | --- |
| 0/32 | 27/32 | 0/32 |
| 0/32 | 0/32 | 0/32 | x = 2

| 0/32 | 0/32 | 0/32 |
| --- | --- | --- |
| 0/32 | 28/32 | 0/32 |
| 0/32 | 0/32 | 0/32 | x = 3

| 0/32 | 0/32 | 0/32 |
| --- | --- | --- |
| 0/32 | 29/32 | 0/32 |
| 0/32 | 0/32 | 0/32 | x = 4

| 0/32 | 0/32 | 0/32 |
| --- | --- | --- |
| 0/32 | 30/32 | 0/32 |
| 0/32 | 0/32 | 0/32 | x = 5

| 0/32 | 0/32 | 0/32 |
| --- | --- | --- |
| 0/32 | 31/32 | 0/32 |
| 0/32 | 0/32 | 0/32 | x = 6

| 0/32 | 0/32 | 0/32 |
| --- | --- | --- |
| 0/32 | 32/32 | 0/32 |
| 0/32 | 0/32 | 0/32 | x = 7

| 0/32 | 1/32 | 0/32 |
| --- | --- | --- |
| 0/32 | 32/32 | 0/32 |
| 0/32 | 0/32 | 0/32 | x = 8

| 0/32 | 2/32 | 0/32 |
| --- | --- | --- |
| 0/32 | 32/32 | 0/32 |
| 0/32 | 0/32 | 0/32 | x = 9

| 0/32 | 3/32 | 0/32 |
| --- | --- | --- |
| 0/32 | 32/32 | 0/32 |
| 0/32 | 0/32 | 0/32 |

⋮ x = 37

| 0/32 | 31/32 | 0/32 |
| --- | --- | --- |
| 0/32 | 32/32 | 0/32 |
| 0/32 | 0/32 | 0/32 | x = 38

| 0/32 | 32/32 | 0/32 |
| --- | --- | --- |
| 0/32 | 32/32 | 0/32 |
| 0/32 | 0/32 | 0/32 | x = 39

| 0/32 | 32/32 | 0/32 |
| --- | --- | --- |
| 0/32 | 32/32 | 0/32 |
| 0/32 | 1/32 | 0/32 | x = 40

| 0/32 | 32/32 | 0/32 |
| --- | --- | --- |
| 0/32 | 32/32 | 0/32 |
| 0/32 | 2/32 | 0/32 |

⋮ x = 69

| 0/32 | 32/32 | 0/32 |
| --- | --- | --- |
| 0/32 | 32/32 | 0/32 |
| 0/32 | 31/32 | 0/32 | x = 70

| 0/32 | 32/32 | 0/32 |
| --- | --- | --- |
| 0/32 | 32/32 | 0/32 |
| 0/32 | 32/32 | 0/32 | x = 71

| 0/32 | 32/32 | 0/32 |
| --- | --- | --- |
| 0/32 | 33/32 | 0/32 |
| 0/32 | 32/32 | 0/32 | x = 72

| 0/32 | 33/32 | 0/32 |
| --- | --- | --- |
| 0/32 | 33/32 | 0/32 |
| 0/32 | 32/32 | 0/32 | x = 73

| 0/32 | 33/32 | 0/32 |
| --- | --- | --- |
| 0/32 | 33/32 | 0/32 |
| 0/32 | 33/32 | 0/32 | x = 74

| 0/32 | 33/32 | 0/32 |
| --- | --- | --- |
| 0/32 | 34/32 | 0/32 |
| 0/32 | 33/32 | 0/32 | x = 75

| 0/32 | 34/32 | 0/32 |
| --- | --- | --- |
| 0/32 | 34/32 | 0/32 |
| 0/32 | 33/32 | 0/32 | x = 76

| 0/32 | 34/32 | 0/32 |
| --- | --- | --- |
| 0/32 | 34/32 | 0/32 |
| 0/32 | 34/32 | 0/32 |

⋮ x = 262

| 0/32 | 96/32 | 0/32 |
| --- | --- | --- |
| 0/32 | 96/32 | 0/32 |
| 0/32 | 96/32 | 0/32 |

*FIG._8A* x = 0

| 0/32 | 0/32 | 0/32 |
| 0/32 | 0/32 | 0/32 |
| 0/32 | 0/32 | 0/32 | x = 1

| 0/32 | 0/32 | 0/32 |
| 0/32 | 27/32 | 0/32 |
| 0/32 | 0/32 | 0/32 | x = 2

| 0/32 | 0/32 | 0/32 |
| 0/32 | 28/32 | 0/32 |
| 0/32 | 0/32 | 0/32 | x = 3

| 0/32 | 0/32 | 0/32 |
| 0/32 | 29/32 | 0/32 |
| 0/32 | 0/32 | 0/32 | x = 4

| 0/32 | 0/32 | 0/32 |
| 0/32 | 30/32 | 0/32 |
| 0/32 | 0/32 | 0/32 | x = 5

| 0/32 | 0/32 | 0/32 |
| 0/32 | 31/32 | 0/32 |
| 0/32 | 0/32 | 0/32 | x = 6

| 0/32 | 0/32 | 0/32 |
| 0/32 | 32/32 | 0/32 |
| 0/32 | 0/32 | 0/32 | x = 7

| 0/32 | 1/32 | 0/32 |
| 0/32 | 32/32 | 0/32 |
| 0/32 | 0/32 | 0/32 | x = 8

| 0/32 | 1/32 | 0/32 |
| 0/32 | 32/32 | 0/32 |
| 0/32 | 1/32 | 0/32 | x = 9

| 0/32 | 2/32 | 0/32 |
| 0/32 | 32/32 | 0/32 |
| 0/32 | 1/32 | 0/32 | x = 10

| 0/32 | 2/32 | 0/32 |
| 0/32 | 32/32 | 0/32 |
| 0/32 | 2/32 | 0/32 | x = 11

| 0/32 | 3/32 | 0/32 |
| 0/32 | 32/32 | 0/32 |
| 0/32 | 2/32 | 0/32 |

•
•
• x = 70

| 0/32 | 32/32 | 0/32 |
| 0/32 | 32/32 | 0/32 |
| 0/32 | 32/32 | 0/32 | x = 71

| 0/32 | 32/32 | 0/32 |
| 0/32 | 33/32 | 0/32 |
| 0/32 | 32/32 | 0/32 | x = 72

| 0/32 | 32/32 | 0/32 |
| 0/32 | 34/32 | 0/32 |
| 0/32 | 32/32 | 0/32 | x = 73

| 0/32 | 32/32 | 0/32 |
| 0/32 | 35/32 | 0/32 |
| 0/32 | 32/32 | 0/32 |

•
•
• x = 134

| 0/32 | 32/32 | 0/32 |
| 0/32 | 96/32 | 0/32 |
| 0/32 | 32/32 | 0/32 | x = 135

| 0/32 | 33/32 | 0/32 |
| 0/32 | 96/32 | 0/32 |
| 0/32 | 32/32 | 0/32 | x = 136

| 0/32 | 34/32 | 0/32 |
| 0/32 | 96/32 | 0/32 |
| 0/32 | 32/32 | 0/32 |

•
•
• x = 198

| 0/32 | 96/32 | 0/32 |
| 0/32 | 96/32 | 0/32 |
| 0/32 | 32/32 | 0/32 | x = 199

| 0/32 | 96/32 | 0/32 |
| 0/32 | 96/32 | 0/32 |
| 0/32 | 33/32 | 0/32 |

•
•
• x = 262

| 0/32 | 96/32 | 0/32 |
| 0/32 | 96/32 | 0/32 |
| 0/32 | 96/32 | 0/32 |

MULTILEVEL SCREENING FOR COLOR LASER PRINTER

RELATED APPLICATIONS

This application is a divisional of U.S. patent application Ser. No. 08/938,927, filed Oct. 2, 1997, now U.S. Pat. No. 6,097,502 which is incorporated here by reference. The present application claims the benefit under 35 U.S.C. 119(e) of U.S. Provisional Patent Application Ser. No. 60/032,551 of the same title, filed Dec. 18, 1996 by Joseph Shu, Andrei Pascovici and Chia-Hsin Li, which is herein incorporated by reference. The present invention is related to U.S. Pat. No. 5,568,572, issued Oct. 22, 1996, by Joseph S. Shu, entitled Method and Apparatus for Tonal Correction in Binary Printing Devices by Predistortion of Image Data, which is incorporated herein by reference; and to U.S. patent application Ser. No. 08/678,884, filed Jul. 12, 1996, by Joseph S. Shu, entitled Method and Apparatus for Automatic Color Correction, issued as U.S. patent application Ser. No. 5,809,213, and is also incorporated herein by reference.

BACKGROUND OF THE INVENTION

1. Field of the Invention

The present invention relates generally to laser printing systems, and more particularly to methods, apparatus, systems and media for producing accurate and visually-pleasing laser printer graphics.

2. Description of the Related Art

A laser printer generates an image on a piece of paper by scanning a Focused laser beam over a cylindrical photosensitive drum, the signal directed to the laser beam for each pixel controlling the length of time which the laser beam is on. The drum converts the laser power incident on the drum to electrostatic charges, and the electrostatic charges attract and retain a powdered ink or "toner" (generically referred to as a "marking medium"). When an electrostatically charged paper (generically referred to as a "printing surface") is rolled against the drum, the toner is transferred to the paper, and the paper is then heated to fuse the toner to the paper. The resolution of the image is determined by the number of scan lines per inch (lpi) and the density of pixel values along each scan line, as measured in dots per inch (dpi). A typical high-resolution laser printer has 600 scan lines per inch and 600 dots per inch along each scan line.

A graph of an exemplary laser signal 100 as a function of pixel position is shown in FIG. 1A, and a graph of the resulting line thickness 130 and a magnified view of the toner line 170 generated by the laser printer are shown in FIGS. 1B and 1C, respectively. (For clarity, the toner line 170 is shown with no toner in the scan lines 160 and 180 directly above and below it 170, respectively, although generally there will be toner in those scan lines 160 and 180 as well.) As may be noted by inspection of FIGS. 1A–C, the thickness of the toner line 170 is roughly proportional to the signal level directed to the laser. The thickness of the toner line 170 reaches a width of one pixel when the level of the laser signal has its full-pixel-width value, PP, and the thickness of the line 170 having a maximum toner width, WM, (which is three pixels in the example of FIG. 1C) when the level of the laser signal has its maximum value, PM.

While a monochromatic image will only require one toner line per scan line, a full-color image will require multiple colored inks per scan line. Most commonly, full-color printed images are generated using cyan, magenta, yellow and black inks, and the image is referred to as the "CMYK" image. Although the present invention applies to full-color image printing as well as monochromatic image printing, for ease of discussion of the present invention only one toner color per scan line is discussed, since the generalization to multiple toners per scan line is straightforward.

Although laser printers can generate images quickly, nonlinearities in the relation between the level directed to the laser and the amount of deposited toner are problematic in the accurate generation of images, especially in regions where the toner density is low (highlight regions) and regions where the toner density is high (shadow regions). One of the nonlinearities associated with the process is the result of interparticulate attraction between toner particles which causes them to clump together, preventing dots of toner deposited on the paper from being below a minimum size. Another cause of nonlinearities between the signal applied to the laser and the resulting toner density is a result of the time required to turn the laser off and on. As illustrated by the graph of the laser signal as a function of pixel number of FIG. 1D and the corresponding graph of incident laser power as a function of distance on the toner drum of FIG. 1E, the length of time that the laser power signal has the maximum laser power value (which is normalized to a value of unity in FIG. 1E) is roughly proportional to the laser signal value. However, the laser power cannot reach the value of unity instantaneously, nor cannot it return to zero power instantaneously. These ramp times effect the proportionality between the laser signal and the laser power. The non-proportionality is most dramatic for small laser signals, such as the signal at pixel number 1, where the finite-length rise and fall times of the laser power prevent the laser power from reaching the unity value.

A graph of an exemplary low-power laser signal 200 is shown in FIG. 2A, and a graph of the resulting line thickness 230 and a magnified view of the toner line 260 generated by the laser printer are shown in FIGS. 2B and 2C, respectively. As may be noted by inspection of FIGS. 2A–C, for pixels which are surrounded by laser values of zero and have laser values which are below an isolated-single-pixel cutoff value, PC1, such as the second pixel, the laser engine cannot deposit any toner on the paper. However, for a pixel which is surrounded by laser values of zero and is above the isolated-single-pixel cutoff value PC1 (such as the fourth pixel), the laser engine can generate a toner covered area 262. Similarly, the laser engine cannot generate a toner covered area for a pair of laser values which are surrounded by laser values of zero, and for which the average value is below an isolated-double-pixels cutoff value, PC2. However, when an isolated pair of pixels, such as the sixth and seventh pixels, have an average value above the isolated-double-pixels cutoff value PC2, a toner covered area 264 is produced. Similarly, the isolated-triple-pixels cutoff PC3 has a value below the isolated-double-pixels cutoff value PC2, and when an isolated triple of pixels (not shown) have an average value above the isolated-triple-pixels cutoff value PC3, a toner covered area is produced, and so on.

The situation is actually somewhat more complex than indicated above, since non-zero values of surrounding pixels influence the cutoff values. For instance, when the laser values surrounding a pixel have a value of one, the smallest printable dot corresponds to a value somewhat less than PC1. And when the laser values surrounding the dot have a value of two, the smallest printable dot corresponds to a value somewhat less still. Similarly, when the laser values surrounding a pair of pixels have a value of one, the smallest printable dot corresponds to an average value of the pair of pixels somewhat less than PC2.

Another nonlinearity of laser printer imaging is found in the larger laser values which produce shadowed regions. A graph of an exemplary laser signal 300 is shown in FIG. 3A, and a graph of the resulting line thickness 330 and a magnified view of the toner line 360 generated by the laser printer are shown in FIGS. 3B and 3C, respectively. As may be noted by inspection of FIGS. 3A–C, for laser values 300 which are near the middle of the range between zero and the full-pixel-width value PP (in this case the first through sixth pixels), the laser engine generates a line 360 whose thickness is roughly proportional to the laser values. However, for laser values which are near the full-pixel-width value PP (such as those of the seventh, eighth and ninth pixels), the laser engine tends to overly darken the pixels.

The underemphasis of low-power laser signals and the overemphasis of high-power laser signals (in scan lines of uniform darkness) is represented by the graph 400 of FIG. 4A, which plots laser value versus toner line thickness, i.e., toner "density." As can be seen from the graph 400, for low values 410 of the laser signal the line thickness is zero, as discussed above in reference to FIGS. 2A–C, and for high values 430 of the laser signal the line thickness reaches unity prior to the laser signal reaching the value PP, as discussed above in reference to FIGS. 3A–C.

Another drawback illustrated by FIG. 4A, is the fact that the laser values have a finite number of discrete values and the line thicknesses therefore have a finite number of discrete thicknesses. This "quantization" of line thicknesses can produce "false contours" when there is an area over which the color changes slowly—false contours occur at boundaries between a region having a gray scale of a first level and an adjoining region having a gray scale at an adjacent level.

These non-linearities and quantization effects makes accurate image printing a difficult and complex problem. An object of the present invention is therefore to provide method, apparatus, system and media for laser printing which has accurate tonal reproduction and is visually pleasing.

More particularly, it is an object of the present invention to provide method, apparatus, system and media for accurate laser printing in areas with low toner densities.

It is another object of the present invention to provide method, apparatus, system and media for accurate laser printing in areas with high toner densities.

It is another object of the present invention is to provide method, apparatus, system and media for laser printing with smooth transitions between gray scales, especially in areas where the image gray scale changes slowly.

SUMMARY OF THE INVENTION

The present invention is directed to a method, apparatus, system and computer-readable media for accurate tone reproduction of a reduced-resolution image generated by a printer engine which deposits ink on a printing surface. The dimensions of a multi-pixel cell are defined, and a font set, which consists of a series of font cells having corresponding font index values, is defined. To generate a portion of the image in a multi-pixel cell, the pixel values of pixels in the multi-pixel cell is mapped to a font index value, and the font cell corresponding to that font index value is printed on the printing surface.

The present invention is also directed to a method, apparatus, system and computer-readable media for accurate tone reproduction of an image on a printing surface where image values are quantized on an image values scale which has more than two values. The image values are mapped to printer values, i.e., values within a range that can be utilized by the printer engine, which are quantized on a printer values scale which is different from the image values scale and has more than two values. Differences between image values and printer values, as measured on the image values scale, are corrected so that a spatial average of image values approximates a spatial average of printer values, as measured on said image values scale. Ink is deposited at the pixel locations on the printing surface in amounts roughly proportional to the printer values.

Other objects and attainments together with a fuller understanding of the invention will become apparent and appreciated by referring to the following description and claims taken in conjunction with the accompanying drawings.

BRIEF DESCRIPTION OF THE DRAWINGS

The foregoing discussion will be understood more readily from the following detailed description of the invention, when taken in conjunction with the accompanying drawings, in which:

FIG. 1A plots an exemplary laser signal having a large range of values as a function of pixel number;

FIG. 1B is a plot of the line thickness versus pixel number for the exemplary laser signal of FIG. 1A;

FIG. 1C shows the toner line generated by the exemplary laser signal of FIG. 1A;

FIG. 1D plots another exemplary laser signal as a function of pixel number; and

FIG. 1E plots the incident laser power as a function of distance on the toner drum;

FIG. 2A plots an exemplary laser signal which includes a number of low-values as a function of pixel number;

FIG. 2B is a plot of the line thickness versus pixel number for the exemplary laser signal of FIG. 2A; and FIG. 2C shows the toner line generated by the exemplary laser signal of FIG. 2A;

FIG. 3A plots an exemplary laser signal which includes a number of high-values as a function of pixel number;

FIG. 3B is a plot of the line thickness versus pixel number for the exemplary laser signal of FIG. 3A; and FIG. 3C shows the toner line generated by the exemplary laser signal of FIG. 3A;

FIG. 4A graphs toner density versus printer value for a typical laser printer printing single pixels and a font set according to the present invention; and FIG. 4B graphs a remapping of printer values used to compensate for limitations in the dynamic range of the laser printer;

FIG. 5A illustrates in block-diagram form, a computer system incorporating the present invention;

FIG. 5B depicts a block diagram of the method of the present invention;

FIG. 5C depicts a block diagram of a first embodiment of the apparatus of the present invention;

FIG. 5D depicts a block diagram of the apparatus of FIG. 5C with a ditherer used to perform the function of the halftoning unit; and FIG. 5E depicts a block diagram of the apparatus of FIG. 5C with an error diffusor used to perform the function of the halftoning unit;

FIG. 6A depicts a scale graduated on the left with scanner values for a single pixel and graduated on the right with printer values for a single pixel;

FIG. 6B depicts a scale graduated on the left with scanner values for a 3×3 font cell and graduated on the right with printer values for a 3×3 font cell; and FIG. 6C depicts the relationship between a particular scanner value and the two nearest printer values;

FIG. 7A shows an exemplary rectangular dithering matrix,

FIG. 7B shows a pixel plane tiled with the dithering matrix of FIG. 7A, and

FIG. 7C shows a pixel plane tiled with non-rectangular dithering matrices;

FIG. 8A shows a first preferred set of fonts for a 3×3 cell;

FIG. 8B shows a second preferred set of fonts for a 3×3 cell;

FIG. 8C shows a set of fonts for a 2×2 cell; and

FIG. 8D shows a set of fonts for a 1×3 cell; and

FIG. 9A shows an exemplary highlighted region which cannot be accurately reproduced by a printer engine, and FIG. 9B shows the font cells corresponding to the region of FIG. 9A.

DESCRIPTION OF THE PREFERRED EMBODIMENTS

A block diagram of the method 500 of the preferred embodiment of the present invention is shown in FIG. 5B. The method 500 begins with a color matching step 510 which receives additive-color pixel data, such as that generated by a scanner, and produces subtractive-color pixel data to be used by a printer. According to industry standards, the additive-color data is in the RGB (i.e., "red/green/blue") color space and the subtractive-color data is in the CMYK (i.e., "cyan/magenta/yellow/black") color space. Preferably the calibration system of the color matching step 510 is implemented according to U.S. patent application Ser. No. 08/678,884 by Joseph S. Shu, entitled Method and Apparatus for Automatic Color Correction, which is incorporated herein by reference. Briefly, this calibration system applies a nonlinear interpolation technique to a relatively small number of measured sample values generated from color image patches to provide a color lookup table having a larger number of calibration values stored therein.

The CMYK data generated by the color matching step 510 is directed to a dot gain compensation step 515, preferably according to the compensation system described in U.S. Pat. No. 5,568,572 by Joseph S. Shu, entitled Method and Apparatus for Tonal Correction in Binary Printing Devices by Predistortion of Image Data, which is also incorporated herein by reference. Briefly, this dot gain compensation process filters the pixel data by application of a filter function which lightens the highlight and upper midtone regions of the image and darkens the shadow and lower midtones areas of the image. The output of the dot gain compensation step 516 is modified CMYK data, represented in FIG. 5B as C'M'Y'K'.

The method 500 continues with a cell definition step 520 where the length NL of a cell in pixels along the scan direction and the width NW of the cell in pixels transverse to the scan direction are defined. (Although the present preferred embodiment utilizes rectangular cells, cells of any shape which can tile a plane may be used.) The dimensions which are selected for the cell are a function of the desired resolution of the printer image. If R1×R2 is the resolution of the printer, then NL×NW cells will produce a resolution of R1/NL×R2/NW, since the NL×NW cell effectively becomes a pixel of the reduced resolution image. For instance for a laser printer which scans at 600 lpi and each scan line has a resolution of 600 dpi, cells which have dimensions of NL=3 and NW=2 produce an image with 300 lpi and 200 dpi.

The method 500 continues with a font definition step 523 where a font set is defined for the cell size specified in the cell definition step 520. As described in detail below, the font set consists of an indexed set of cells, each element of the set is a "font" with a specified pattern of printer values for the pixels of the cell. The font set has the properties that: in the font cell having a font index value of zero all printer pixel values are zero; in the font cell having a font index value of one all printer pixel values are zero except for a single pixel having an isolated-single-pixel cutoff value; with each incrementation of unity of the font index, a printer pixel value for a pixel in the cell is incremented by unity such that all printer pixel values are zero except for pixels in a line along the scan direction; and the final font cell consists of a line of pixels along the scan direction having a full-cell-width printer pixel value, and pixels of zero value elsewhere.

The data is then directed to a multilevel halftoning step 525 where each component of the C'M'Y'K' data is mapped to a range of values suitable for use by a printer engine 540. Typically, if each component of the C'M'Y'K' data is obtained from a scanner it is an 8-bit number, and therefore each component has an integer value between 0 and 255. Such data will be referred to as "scanner values." Typically each component of the data used by the printer engine (i.e., "printer data") has an integer value between a value of 0 and a value of 32, with the value of 32 being the full-pixel-width value PP.

The relation of scanner data values to printer data values for a pixel is illustrated by the multilevel halftoning step of FIG. 6A, where the height of the scale 605 is graduated in 255 equal increments on the left side 610, and graduated in 32 equal increments on the right side 615, since a laser value of 32 will generate an area of ink with the width of a single pixel. However, according to the present invention, the scanner values within a cell are summed and mapped to font index values, as described in detail below. FIG. 6B depicts the relation of scanner values 611 for a 3×3 cell to font index values 616 for a 3×3 cell. Under the assumption that the scanner values of a single pixel range from 0 to 255, there is a range of 2295=9×255 for a 3×3 cell, and as shown in detail below, the font index values for a 3×3 cell range from 0 to 262.

It should be noted that scanner value graduations of the left side 610 of the scale 605 generally do not occur at the same positions as the printer value graduations along the right side 615 of the scale 605. Therefore, as depicted in FIG. 6C, a printer value of $(SV/\Delta)$ will generally fall between two integer values, A and B, where $\Delta=SM/PM$, PM is the maximum printer value and SM is the maximum scanner value. Given that the distance between $(SV/\Delta)$ and the integer printer value A is X, and the distance between $(SV/\Delta)$ and the integer printer value B is then $(1-X)$, to provide accurate tone reproduction of a region having a printer value of $(SV/\Delta)$, a means must be achieved for printing X% of the pixels in that region with a printer value of B, and $(1-X)\%$ of the pixels in that region with a printer value of A.

According to the present invention, a halftoning method such as error diffusion or dithering is used to insure that an average printer value PV is equal to $(SV/\Delta)$, i.e., the average printer value PV is equal to the corresponding scanner value SV as measured on the printer value scale. This effectively provides regions with a spatially-averaged printer value equal to a spatially-averaged scanner value, since the eye tends to average fluctuations with wavelengths on the order of the pixel-to-pixel separation.

According to the error diffusion method of the present invention, the error generated at a particular pixel may be passed on to any group of neighboring pixels. As an example, consider the case where the error at the (i-1)th pixel along a scan line is added to the next pixel, i.e., the ith pixel. In this case, the printer value PV(i) at the current pixel (i.e., the ith pixel) is set equal to PV(i)=[SV(i)/Δ+E(i-1)+1/2], where E(i-1) is an error value produced at the previous pixel, and the square brackets indicate truncation to the next lowest integer. The error term E(i) at the ith pixel is defined as E(i)=SV(i)/Δ+E(i-1)−[SV(i)/Δ+E(i-1)+1/2].

For instance, assume that PM=32 and SM=255, so Δ≅7.96875. Then, if the scanner value SV of a particular pixel is 20, and the error from the previous pixel was 0.452, then the value ((32×20/255)+0.452+0.5)=3.46180, is truncated to the nearest integer to provide a printer value PV of 3, and the error of −0.03820 is added to the next pixel. And, if the scanner value SV of the next pixel is 37, since the error from the previous pixel was −0.03820, then the value ((32×37/255)−0.03820+0.5)=5.10494, is truncated to the nearest integer to provide a printer value PV of 5, and the error of −0.39506 is added to the next pixel, and so on. It should be understood that the present invention is directed to any method for the diffusion of errors caused by integer rounding of printer values PV(i,j) in the translation from scanner values SV(i,j), such that spatially averaged printer values PV(i,j) approximate spatially averaged scanner values SV(i,j), as measured on the printer values scale.

According to the dithering technique of the present invention, the printer value PV at the (i,j) pixel is related to the scanner value SV at the (i,j) pixel by PV(i,j)=[(SV(i,j)+M(modM1(i), modM2(j)))/Δ], where M is an M1×M2 dithering matrix having values pseudorandomly distributed between zero and ([Δ+0.5]−1), and the square brackets indicate truncation to the next lowest integer. The additional of small random values to the scanner value SV(i,j) prior to truncation acts to randomly raise some printer values PV(i,j) to equal ([SV(i,j)/Δ]+1) and truncate the remainder of the arguments at [SV(i,j)/Δ] in the proportions of (1-X)% and X%, respectively, as discussed above.

FIG. 7A depicts an exemplary 5×5 dithering matrix 700 for the case where Δ=255/32=7.96875. As can be determined by inspection, the 5×5 dithering matrix 700 has approximately an equal number of entries of each value between 0 and 7 (in this particular instance, there are three entries of each value between 0 and 7, except that there are four 4's). As illustrated by FIG. 7B, the addition of M(modM1(i), modM2(j)) to the scanner value SV(i,j) is equivalent to the tiling of the pixel image with dithering matrices 700, and the selection of the entry in the dithering matrix M corresponding to the particular pixel (i,j). For instance, for a 5×5 dithering matrix, the (46,74) pixel corresponds to the (1,4) entry in the dithering matrix M (where the entry in the top left-hand corner of the matrix is notated as the (0,0) entry), and if the (46, 74) pixel happens to have a value of 134, the resulting printer value PV(i,j) is [(134+1)/7.96875]=16.

Although rectangular dithering matrices are generally used, it should be noted that the dithering matrix may have any shape which can tile the plane, as illustrated by the tiling of the plane with a non-rectangular six-element dithering matrix shown in FIG. 7C. It should be understood that the present invention is directed to any method for the addition of random values to the scanner values SV(i,j) such that integer rounding produces printer values PV(i,j) which when spatially averaged approximate spatially averaged scanner values SV(i,j), as measured on the printer values scale.

Once the printer values PV have been converted to scanner values SV by multilevel halftoning 525, cells of printer values PV are mapped to font cells using a font indexing method 530. For example, if the cell size was defined to be 3×3 at the cell definition stage 520, a font set of 3×3 cells would be required. An exemplary 3×3 font set according to the method of the present invention is shown in FIG. 8A, and it is important to note that each font is printable by a laser engine having limitations such as an isolated-single-pixel cutoff value PC1 and an isolated-double-pixels cutoff value PC2, and the font set is chosen such that differences in total deposited ink between consecutive font cells is minimized. It should also be noted that in all the font sets described below: in the font cell having a font index value of zero all printer pixel values are zero; in the font cell having a font index value of one all printer pixel values are zero except for a single pixel having an isolated-single-pixel cutoff value; as the font index value of subsequent font cells is incremented a printer pixel value is incremented such that all printer pixel values are zero except for a group of adjacent pixels in a line along the scan direction; and the final font cell consists of a line of pixels along the scan direction having a full-cell-width printer pixel value, and pixels of zero value elsewhere. For all font cells (except the font cell corresponding to the font index value of zero) the nonzero pixels have a value less than a full-cell-width printer pixel value and at least one pixel has a value greater than the isolated-single-pixel cutoff value. Roughly the toner line width is proportional to laser signal , so if the full-pixel-width printer value is 32, then in the present specification the full-cell-width printer value for a 2×2 cell will assumed to be 64 (resulting in a resolution of 300 lpi×300 dpi), the full-cell-width printer value for a 3×3 cell will assumed to be 96 (resulting in a resolution of 200 lpi ×200 dpi), the full-cell-width printer value for a 4×4 cell will assumed to be 128 (resulting in a resolution of 150 lpi×150 dpi).

It will be assumed that for 3×3 cells the full-cell-width printer pixel value, i.e., the laser value that will produce a toner line width of 3 pixels is 96. It will be assumed that for 3×3 cells the full-cell-width printer pixel value, i.e., the laser value that will produce a toner line width of 3 pixels is 96. As before, it will be assumed that the isolated-single-pixel cutoff value PC1 of the laser engine is 27, the isolated-double-pixels cutoff value PC2 is 15, and the scan direction of the laser printer is along the vertical direction. As shown in FIG. 8A, the font cell with a font index value x of zero (i.e., the zeroth cell, labeled as x=0, which is actually the first cell depicted in FIG. 8A) has zero entries in each of the nine pixels of the cell. (As a reminder that the full-pixel-width value is 32, all entries in the font cells of FIGS. 8A–E are written as a numerator over the denominator value of 32.) The font cell with a font index value x of 1 (i.e., the first cell) has zero entries in each of the pixels, except for a value of 27 in the center pixel, and since this pixel has a value equal to the isolated-single-pixel cutoff value PC1 it is printable. The second font cell has zero entries in each of the pixels except for a value of 28 in the center pixel, the third cell has zero entries in each of the pixels except for a value of 29 in the center pixel, and so on, until the sixth cell which has zero entries except for a value of 32 in the center pixel, and of course each of these font cells is also printable. For font cells from the seventh cell to the thirty-eighth cell, the center pixel has the full-pixel-width value of 32, and the cell directly above the center cell has increasing values from 1 to 32, and since the average value of the two adjacent non-zero pixels is greater than the isolated-double-pixels cutoff value PC2, these font cells are printable. For instance, for the seventh cell the center pixel has a value of 32 and the pixel above the center cell has a value of 1, for the eighth cell the center pixel has a value of 32 and the pixel above the center cell has a value of 2, and so on, until the thirty-eighth cell where the center pixel has a value of 32 and the pixel above the center cell also has a value of 32. Then, for font cells from the thirty-ninth cell to the seventieth cell, the center pixel has the full-pixel-width value of 32, the pixel above the center pixel has the full-pixel-width value of 32, and the cell directly below the center cell has increasing values from 1 to 32. Then, for font cells from the seventy-first cell to the two-hundred-and-sixty-second cell, the pixels in the middle of the central column, the top of the central column and the bottom of the central column are sequentially increased by unity. For instance, for the seventy-first cell the center pixel has a value of 33, and the pixel above the center pixel has a value of 32, and the pixel below the center pixel has a value of 32; for the seventy-second cell the center pixel has a value of 33, and the pixel above the center pixel has a value of 33, and the pixel below the center pixel has a value of 32; for the seventy-third cell the center pixel has a value of 33, and the pixel above the center pixel has a value of 33, and the pixel below the center pixel has a value of 33; for the seventy-fourth cell the center pixel has a value of 34, and the pixel above the center pixel has a value of 33, and the pixel below the center pixel has a value of 33; and so on until the two-hundred-and-sixty-second cell where the center pixel has the maximum printer value of 96, and the pixel above the center pixel has the maximum printer value of 96, and the pixel below the center pixel has the maximum printer value of 96.

It should be noted that for the font cells of FIG. 8A (except the zeroth cell), the sum of the pixel values in a cell, minus 26, is equal to the label value of the cell, or mathematically:

$$x = \left(\sum_{\text{cell}} \text{pixel value}\right) - 26$$

That is, the total density of toner in each cell increases by unity with each consecutive font cell. Each of these font cells is printable, and (except for the gap between the total toner density of the zeroth and first font cells) the difference between the total toner density of consecutive font cells is minimized. Therefore, by consolidating the printer values within each cell, only one discontinuity between the printer values and the total toner density remains, and that is the gap associated with total toner densities in a cell from 1 to 26.

The advantage of mapping pixel values to the font cells of the present invention is illustrated by considering the exemplary highlight region with pixel values as depicted in FIG. 9A. Because, the isolated single nonzero-valued pixels have a value below the isolated-single-pixel cutoff value PC1 and the isolated pairs of nonzero-valued pixels have values below the isolated-double-pixels cutoff value PC2, etc., the printer engine is not be able to deposit any toner in this region. However, if the printer values in each 3×3 cell are summed and a font cell with the same value as the sum of the printer values is substituted, the printable cells of pixel values depicted in FIG. 9B is produced, where the pixels have zero values except for the second, fifth and eighth pixels in the middle column which have values of 30, 31 and 32, respectively. The increase in dynamic range produced by the font is represented in FIG. 4A. For instance, in the example of FIGS. 9A and 9B where a 3×3 cell is used, the minimum printer value which produces a nonzero toner density decreases by a factor of 9 from R1 to R1'.

It should be noted that there are a variety of fonts which may be defined having the properties that: in the font cell having a font index value of zero all printer pixel values are zero; in the font cell having a font index value of one all printer pixel values are zero except for a single pixel having an isolated-single-pixel cutoff value; as the font index value of subsequent font cells is incremented a printer pixel value is incremented such that all printer pixel values are zero except for pixels in a line along the scan direction; and the final font cell consists of a line of pixels along the scan direction having a full-cell-width printer pixel value, and pixels of zero value elsewhere.

An exemplary alternative to the font set of FIG. 8A is shown in FIG. 8B. As before, the zeroth cell (which is actually the first cell depicted in FIG. 8B) has zero entries in each of the nine pixels of the cell; the first cell has zero entries in each of the pixels, except for a value of 27 (the isolated-single-pixel cutoff value PC1) in the center pixel; the second cell has zero entries in each of the pixels except for a value of 28 in the center pixel, and so on, until the sixth cell which has zero entries except for a value of 32 in the center pixel. Then for font cells from the seventh cell to the seventieth cell, the center pixel has the full-pixel-width value of 32, and the cell directly above and below the center cell are alternately incremented until the cells directly above and below the center cell reach a value of 32. For instance, for the seventh cell the central pixel has a value of 32, the pixel above it has a value of 1, and all the other pixels have values of 0; for the eighth cell the central pixel has a value of 32 and the pixels above and below it have values of 1; for the ninth cell the central pixel has a value of 32, the pixel above it has a value of 2, the pixel below it has a value of 1, and all the other pixels have values of 0, and so on, until the seventieth cell where the central pixel and the pixels directly above and below it have values of 32. For the font cells from the seventy-first cell to the one-hundred-and-thirty-fourth cell, the value of the central pixel is incremented by unity, so for the seventy-first cell the central pixel has a value of 33, the pixels directly above and below the central pixel have values of 32, and all other pixels in the cell have a value of zero; for the seventy-second cell the central pixel has a value of 34, the pixels directly above and below the central pixel have values of 32, and all other pixels in the cell have a value of zero; and so on, until the ninety-sixth cell where the central pixel has a value of 96 (the maximum pixel value), the pixels directly above and below the central pixel have values of 32, and all other pixels in the cell have a value of zero. Similarly, for the font cells from the one-hundred-and-thirty-fifth cell to the one-hundred-and-ninety-eighth cell, the value of the pixel above the central pixel is incremented by unity, so for the one-hundred-and-thirty-fifth cell the central pixel has a value of 96, the pixel directly above the central pixel has a value of 33, the pixel directly below the central pixel has a value of 32, and all other pixels in the cell have a value of zero; for the one-hundred-and-thirty-sixth cell the central pixel has a value of 96, the pixel directly above the central pixel has a value of 34, the pixel directly below the central pixel has a value of 32, and all other pixels in the cell have a value of zero; and so on. Finally, for the font cells from the one-hundred-and-ninety-ninth cell to the two-hundred-and-sixty-second cell, the central pixel and the pixel above the central pixel have values of 96, and the value of the pixel below the central pixel is incremented by unity. Therefore, for the one-hundred-and-ninety-ninth cell the central pixel and the pixel above it have values of 96, and the pixel directly below the central pixel has a value of 33, for the two-hundredth cell the central pixel and the pixel above it have values of 96, and the pixel directly below the central pixel has a value of 34, and so on, until the two-hundred-and-sixty-second cell where central pixel and the pixels above and below it have values of 96.

The 3×3 font cells reduce the resolution vertically and horizontally by a factor of three, so a 600 lpi (lines per inch)×600 dpi (dots per inch) laser printer will have a resolution of 200 dpi×200 dpi when 3×3 cells are used. In general, font cells of dimension NL×NT may be used, where NL is an integer representing the length of the cell along the scan direction of the laser, and NT is an integer representing the width of the cell transverse to the scan direction of the laser, and the product (NL*NT) is greater than unity, and the resulting resolution is (600/NL) dpi×(600/NT) dpi.

For instance, a font set for 2×2 cells is shown in FIG. 8C. As was the case with the font sets for 3×3 cells of FIGS. 8A and 8B: the zeroth cell (x=0) has values of zero for each pixel; the first cell (x=1) has values of zero for each pixel except for a single pixel with a value of 27, the isolated-single-pixel cutoff value PC1; the second cell (x=2) has values of zero for each pixel except for a single pixel with a value of 28, one greater than the isolated-single-pixel cutoff value PC1; and so on until the sixth cell (x=6) which has values of zero for each pixel except for a single pixel with a value of 32, the full-pixel-width value. In the case of the particular font depicted in FIG. 8C, the pixel with a nonzero value in the first through the sixth cell is in the upper right-hand corner, although any pixel in the cell may be selected to have the nonzero value. And as was the case for the fonts for 3×3 cells of FIGS. 8A and 8B, there are a variety of ways of defining 2×2 cells such that the difference in total toner density of consecutive font cells is minimized and each font cell is printable. As was the case with the font sets for 3×3 cells of FIG. 8A: the seventh cell has values of zero for each pixel except for a pixel with a value of 1 and a pixel with a value of 32, the full-pixel-width value PP; the eighth cell has values of zero for each pixel except for a pixel with a value of 2 and a pixel with a value of 32; and so on until the thirty-eighth cell (x=38) which has values of zero for each pixel except for two pixels with values of 32. In the case of the font depicted in FIG. 8C, in the seventh cell through the thirty-eighth cell, the pixel with a value of 32 is in the upper right-hand corner, and the other pixel with a nonzero value is in the bottom right-hand corner, although any other pair of pixels in the cell may be selected to have the nonzero values. Then, for the thirty-ninth through one-hundred-and-third cells, the two right-hand pixels are alternately incremented, much as the pixel values are incremented in the seventieth through two-hundred-and-sixty-second cells of the font of FIG. 8A. For instance, the thirty-ninth cell has a value of 33 in the upper right-hand corner and a value of 32 in the lower right-hand corner, and zero values of the left-hand side; the fortieth cell has a value of 33 in the upper right-hand corner and a value of 33 in the lower right-hand corner, and zero values of the left-hand side; the forty-first cell has a value of 34 in the upper right-hand corner and a value of 33 in the lower right-hand corner, and zero values of the left-hand side; and so on until the one-hundred-and-third cell which has values of 64, the double-pixel-width value P2P, in both right-hand pixels.

It should be understood that the cells need not be square, as exemplified by the font set of FIG. 8D where the cells have a width of 3 pixels and a length of 1 pixel, and where, as previously, the scan direction of the laser printer is vertical. As was the case with the font sets depicted in FIGS. 8A, 8B and 8C: the zeroth cell (x=0) has values of zero for each pixel; the first cell (x=1) has values of zero for each pixel except for a single pixel with a value of 27, the isolated-single-pixel cutoff value PC1; the second cell (x=2) has values of zero for each pixel except for a single pixel with a value of 28, one greater than the isolated-single-pixel cutoff value PC1; and so on until the sixth cell (x=6) which has values of zero for each pixel except for a single pixel with a value of 32, the full-pixel-width value. In the case of the particular font depicted in FIG. 8D, the pixel with a nonzero value in the first through the sixth cell is in the center, although any column in the cell may be selected to have the nonzero value. Continuing, the seventh cell has a value of 33 in the center pixel and values of zero in the other pixels, the eighth cell has a value of 34 in the center pixel and values of zero in the other pixels, and so on until the seventieth cell which has a value of 96 in the center pixel and values of zero in the other pixels.

The font cells of the present invention are selected to minimize the differences between cells of consecutive font index values in the total amount of deposited toner, and increases the dynamic range of the printer engine, thereby improving the accuracy of tone reproduction. The dynamic range of the system is further improved by a dynamic range adjustment. The dynamic range adjustment 535 involves the determination of the density versus font index value curve of FIG. 4A. Then, the font index values are remapped in the multilevel halftoning step 525 via the linear function shown in FIG. 4B, where a font index value of x prior to dynamic range adjustment is mapped to a value of x' where $x'=R1'+(R2'-R1')*x/N$, and N is the maximum font index value, and any remaining nonlinearities are compensated for in the dot gain compensation step 515, as discussed above.

The present invention is preferably practiced in the context of a computer system such as the IBM PS/2 or Apple Macintosh computer. A representative environment is depicted in FIG. 5A, and includes a computer 50 controlled by a central processing unit 52, which may be a conventional microprocessor. A number of other additional units, all interconnected via a system bus 58 are provided to accomplish specific tasks. Although a particular computer system may have only some of the units depicted in FIG. 5A or may have additional components not shown, most computers will include at least the units shown.

Computer 50 includes a random access memory (RAM) 56 for temporary storage of information, a read only memory (ROM) 54 for permanent storage of the computer's configuration and basic operating commands, an input/output (I/O) adapter 70 for connecting peripheral devices such as a disk drive 73, printer 75 and scanner 77 to bus 58 via cables 72, 74 and 76, respectively. A user interface adapter 66 is also provided for connecting input devices such as a mouse, speakers and microphones or keyboard 80 to bus 58. Visual output is provided by a display adapter 68, which connects bus 58 to a display device 82 such as a video monitor. Computer 50 has resident thereon and is controlled and coordinated by a suitable operating system.

Most relevant to the present invention is printer 75, which typically accepts image, graphic and/or text information from an application program (such as a text editor, graphics program or image processor) resident in RAM 56. Control of printer 75, including the cell definition 520, multilevel halftoning 525, font indexing 530 and dynamic range adjustment 535 of the present invention, may be carried out by suitable hardware or software modules resident in the printer 75 or the computer 50. Generically known as "drivers," these modules process raw image date, graphic information and/or text information from the computer 50, possibly having originated in the scanner 77, into a form suitable for directly controlling the printer engine 540.

An apparatus 505 corresponding to the method of FIG. 5B is depicted in FIG. 5C. The color matcher 511 receives additive receives additive-color pixel data, such as that generated by a scanner, and produces subtractive-color pixel data to be used by a printer. Preferably the color matcher 511 is implemented according to U.S. patent application Ser. No. 08/678,884 by Joseph S. Shu, entitled Method and Apparatus for Automatic Color Correction, as described above. The CMYK data generated by the color matcher 511 is directed to a dot gain compensator 516, which is preferably implemented according to the compensation system described in U.S. Pat. No. 5,568,572 by Joseph S. Shu, entitled Method and Apparatus for Tonal Correction in Binary Printing Devices by Predistortion of Image Data, as also described above. The output of the dot gain compensator 516 is modified CMYK data, represented in FIG. 5D as C'M'Y'K'. The data is then directed to a halftoning unit 528 which performs a halftoning operation whereby each component of the C'M'Y'K' data is mapped to a range of values suitable for use by a printer engine 541 such that spatially-averaged printer values approximate spatially-averaged scanner values, as described above in connection with FIG. 5B. The halftoning produced by the halftoning unit 528 may be performed by a ditherer 526, as depicted in the particular embodiment 501 of the apparatus 505 of FIG. 5C shown in FIG. 5D, or by an error diffusor 527, as depicted in the particular embodiment 502 of the apparatus 505 of FIG. 5C shown in FIG. 5E. The dithering and error diffusion operations performed by the ditherer 526 and error diffusor 527, respectively, are discussed in detail above in reference to the method depicted in FIG. 5B.

The output of the halftoning unit 528 is directed to a halftone font indexer 531 which maps multi-pixel cells of printer values with dimensions determined by cell dimension definition unit 521 to halftone fonts stored in font cell generator 522. The cell dimension definition unit 521 may consist of storage registers for storing the cell length NL and the cell width NW, and may include means for querying an end user for the desired resolution of the printer image and calculating the cell length NL and the cell width NW based on the desired resolution. As discussed in detail above in connection with FIGS. 8A, 8B, 8C and 8D, the font cells stored in or generated by the font cell generator 522 have the following properties: in the font cell having a font index value of zero all printer pixel values are zero; in the font cell having a font index value of one all printer pixel values are zero except for a single pixel having an isolated-single-pixel cutoff value; as the font index value of subsequent font cells is incremented a printer pixel value is incremented such that all printer pixel values are zero except for a group of adjacent pixels in a line along the scan direction; the final font cell consists of a line of pixels along the scan direction having a full-cell-width printer pixel value, and pixels of zero value elsewhere; for all font cells (except the font cell corresponding to the font index value of zero) the nonzero pixels have a value less than a full-cell-width printer pixel value; and at least one pixel has a value greater than the isolated-single-pixel cutoff value. Thereby, the font cell output produced by the halftone font indexer 531 has an increased dynamic range and smoother transitions between tones, thereby improving the accuracy of tone reproduction as discussed in detail above. Finally, the output of the halftone font indexer 531 is directed to a dynamic range adjuster 536 where the font index values are remapped according to the linear function shown in FIG. 4B based on the determination of the density versus font index value curve of FIG. 4A, and printed by the printer engine 541.

It should be understood that the block units of FIGS. 5B, 5C, 5D and 5E may be implemented using a programmed general-purpose digital computer, using application specific integrated circuits, using a network of interconnected conventional components and circuits, or using a multithreaded multitasking environment. Alternatively, the block units of FIGS. 5C–E may be considered to represent a series of special purpose computers, each containing its own CPU, for implementing the corresponding methods, or may represent computer useable media having computer readable program code, or may even represent hardware implementations of the methods. Furthermore, the invention described above may be implemented as a component of a conventional processor-driven imaging device, such a facsimile machine, document copier, or the like. In summary, those skilled in the art should readily appreciate that programs defining these functions can be delivered to a computer in many forms, including but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention. Furthermore, it should be understood that while the level of detail of the method and apparatus presented in the present specification has been shown at a function-block level, it is within the scope of one skilled in the art to develop the appropriate specific circuits to accomplish these functions.

The foregoing description of the preferred embodiments of the invention is only by way of example, and other variations of the above-described embodiments and methods are provided by the present invention. Having described preferred embodiments of the present invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for accurate reduced-resolution tone reproduction of a printed image based on an image of image values, said printed image being generated by a printer engine with a printer resolution which deposits a marking medium at pixels on a printing surface, an amount of said marking medium deposited at said pixels being a function of printer values for said pixels, comprising the steps of:

(a) defining dimensions of a multi-pixel cell of said pixels;

(b) defining a set of font cells, each of said font cells having an arrangement of font pixel values for said pixels in said multi-pixel cell and a corresponding font index value;

(c) mapping said image values for said pixels in said multi-pixel cell to a corresponding one of said font cells; and (d) printing said font pixel values for said corresponding one of said font cells in said multi-pixel cell on said printing surface.

2. The method of claim 1 wherein said dimensions of said multi-pixel cell are a cell length, in units of a separation between said pixels, along a scan direction of a means for printing in said printer engine, and said printer resolution is reduced by a first factor equal to said cell length along said scan direction, and a cell width transverse said scan direction, in said units of said separation between said pixels, and said printer resolution is reduced by a second factor equal to said cell width transverse said scan direction.

3. The method of claim 1 wherein said printer engine cannot deposit any of said marking medium on said printing surface at a first of said pixels when a first printer value for said first of said pixels is less than an isolated-single-pixel cutoff value, and said printer values of said pixels surrounding said first pixels are zero.

4. The method of claim 3 wherein said set of font cells includes:

a zeroth of said font cells having said font index value of zero and having said font pixel values of zero for each of said pixels of said multi-pixel cell;

a first of said font cells having said font index value of one and having said font pixel values of zero for each of said pixels of said multi-pixel cell except for a single one of said pixels in a first column of said multi-pixel cell for which said font pixel value is equal to said isolated-single-pixel cutoff value; and an Nth of said font cells having said font index value of N, where N is an integer, and having said font pixel values of zero for each of said pixels of said multi-pixel cell in all columns except said first column of said multi-pixel cell, a sum of said font pixel values for said pixels in said first column being equal to N minis unity plus said isolated-single-pixel cutoff value, said pixels in said first column with nonzero values for said font pixel values being adjacent, at least one of said pixels in said first column having said font pixel value greater than or equal to said isolated-single-pixel cutoff value, and none of said pixels in said first column having said font pixel value greater than a full-cell-width value, where said marking medium deposited by said printer for any of said pixels having said font pixel value equal to said full-cell-width value has a deposition width transverse said scan direction equal to said cell width.

5. The method of claim 4 wherein said set of font cells further includes an (N+1)th of said font cells having said font index value of (N+1) and having said font pixel values of zero for each of said pixels of said multi-pixel cell in all columns except said first column of said multi-pixel cell, a sum of said font pixel values for said pixels in said first column being equal to N plus said isolated-single-pixel cutoff value, said pixels in said first column with nonzero values for said font pixel values being adjacent, at least one of said pixels in said first column having said font pixel value greater than or equal to said isolated-single-pixel cutoff value, and none of said pixels in said first column having said font pixel value greater than a full-cell-width value, where said marking medium deposited by said printer for any of said pixels having said font pixel value equal to said full-cell-width value has a deposition width transverse said scan direction equal to said cell width, whereby a difference in deposition of said marking medium for said Nth of said font cells and said (N+1)th of said font cells is minimized.

6. The method of claim 4 wherein said printer engine cannot deposit any of said marking medium on said printing surface at an adjacent pair of said pixels when a first sum of said printer values for said adjacent pair of said pixels is less than twice an isolated-double-pixels cutoff value, and said printer values of said pixels surrounding said adjacent pair of said pixels are zero.

7. The method of claim 5 wherein step (c) includes the step of adding said image values in said multi-pixel cell to provide a cell value quantized on a cell value scale which ranges from zero to a product of said cell width and said cell length and a maximum allowed value for said image values.

8. The method of claim 7 further including the step of:

mapping said cell values to said font index values, quantized on a font index scale which differs from said cell values scale.

9. The method of claim 8 wherein a difference between said cell value for a first one of said multi-pixel cells and said font index value for said first one of said multi-pixel cells, as measured on said font index scale, is contributed to said cell value of a second one of said multi-pixel cells adjacent said first one of said multi-pixel cells, whereby a first average of said font index values of said first one of said multi-pixel cells and said second one of said multi-pixel cells approximates a second average of said cell values of said first one of said multi-pixel cells and said second one of said multi-pixel cells, as measured on said font index scale.

10. The method of claim 9 wherein said font index value for said first one of said multi-pixel cells is set equal to said cell value for said first one of said multi-pixel cells, as measured on said font index scale, plus a random variable.

11. The method of claim 10 wherein said random variable is randomly distributed between a value of unity, and a ratio of a first maximum of said cell values scale divided by a second maximum of said font index scale, minus unity.

12. The method of claim 7 wherein step (c) includes the use of a dithering technique.

13. The method of claim 7 wherein step (c) includes the use of an error diffusion technique.

14. The method of claim 7 further including the step of dynamic range adjustment to correct for nonlinearities of said marking medium deposited in said multi-pixel cells as a function of said font index values.

15. An apparatus for accurate reduced-resolution tone reproduction of a printed image based on an image of image values, said printed image being generated by a printer engine with a printer resolution which deposits a marking medium at pixels on a printing surface, an amount of said marking medium deposited at said pixels being a function of printer values for said pixels, comprising:

cell definition unit for defining dimensions of a multi-pixel cell of said pixels;

font cell generator for defining a set of font cells, each of said font cells having an arrangement of font pixel values for said pixels in said multi-pixel cell and a corresponding font index value; and halftone font indexer for mapping said image values for said pixels in said multi-pixel cell to a corresponding one of said font cells, said printer engine printing said font pixel values for said corresponding one of said font cells in said multi-pixel cell on said printing surface.

16. An apparatus for accurate reduced-resolution tone reproduction of a printed image based on an image of image values, said printed image being generated by a printer engine with a printer resolution which deposits a marking medium at pixels on a printing surface, an amount of said marking medium deposited at said pixels being a function of printer values for said pixels, comprising:

means for defining dimensions of a multi-pixel cell of said pixels;

means for defining a set of font cells, each of said font cells having an arrangement of font pixel values for said pixels in said multi-pixel cell and a corresponding font index value; and means for mapping said image values for said pixels in said multi-pixel cell to a corresponding one of said font cells, said printer engine printing said font pixel values for said corresponding one of said font cells in said multi-pixel cell on said printing surface.

17. A system for printing a reduced-resolution image of image values on a printing surface with accurate tone reproduction, comprising:

a printer engine with a printer resolution which deposits a marking medium at pixels on said printing surface, an amount of said marking medium deposited at said pixels being a function of printer values for said pixels;

a printer engine for depositing marking medium on said printing surface;

cell dimensions definition unit for defining dimensions of a multi-pixel cell of said pixels;

font cell generator for providing a set of font cells, each of said font cells having an arrangement of font pixel values for said pixels in said multi-pixel cell and a corresponding font index value; and halftone font indexer for mapping said image values for said pixels in said multi-pixel cell to a corresponding one of said font cells, said printer engine printing said font pixel values for said corresponding one of said font cells in said multi-pixel cell on said printing surface.

18. A computer program for use with an image reproduction system including a scanner, a processor and a printer having a printer engine for depositing marking medium at pixels on a printing surface, for providing accurate reduced-resolution tone reproduction of an image of image values, an amount of said marking medium deposited at said pixels being a function of printer values for said pixels, the computer program comprising:

a computer useable medium having computer readable program code to define dimensions of a multi-pixel cell of said pixels;

a computer useable medium having computer readable program code to define a set of font cells, each of said font cells having an arrangement of font pixel values for said pixels in said multi-pixel cell and a corresponding font index value;

a computer useable medium having computer readable program code for mapping said image values for said pixels in said multi-pixel cell to a corresponding one of said font cells, said printer engine printing said font pixel values for said corresponding one of said font cells in said multi-pixel cell on said printing surface.

19. A method for accurate reduced-resolution tone reproduction of a printed image based on an image of image values obtained via a scanner, said printed image being generated by a printer engine with a printer resolution which deposits a marking medium at pixels on a printing surface, an amount of said marking medium deposited at said pixels being a function of printer values for said pixels, comprising the steps of:

calibrating printer colors generated by said printer engine with said image values obtained from said scanner to produce calibrated image values;

filtering said calibrated image values to provide filtered values lighter than said calibrated image values in highlight and upper midtone regions and darker than said calibrated image values in shadow and lower midtone regions, said filtered values being quantized on a filtered values scale having a maximum filtered value and more than two filtered scale levels;

mapping said filtered values for said pixels to printer values, said printer values being quantized on a printer values scale having more than two printer scale levels and a maximum printer value which differs from said maximum filtered value, differences between said filtered values and said printer values, as measured on said filtered values scale, being corrected such that a first spatial average over a region of said filtered values approximates a second spatial average over said region of said printer values, as measured on said filtered values scale;

defining dimensions of a multi-pixel cell of said pixels;

defining a set of font cells, each of said font cells having an arrangement of font pixel values for said pixels in said multi-pixel cell and a corresponding font index value;

mapping said printer values for said pixels in said multi-pixel cell to a corresponding one of said font cells, said printer engine printing said font pixel values for said corresponding one of said font cells in said multi-pixel cell on said printing surface; and adjusting a dynamic range of said font cells as printed by said printer engine to provide an extended dynamic range.

20. An apparatus for accurate reduced-resolution tone reproduction of a printed image based on an image of image values obtained via a scanner, said printed image being generated by a printer engine with a printer resolution which deposits a marking medium at pixels on a printing surface, an amount of said marking medium deposited at said pixels being a function of printer values for said pixels, comprising:

means for calibrating printer colors generated by said printer engine with said image values obtained from said scanner to produce calibrated image values;

means for filtering said calibrated image values to provide filtered values lighter than said calibrated image values in highlight and upper midtone regions and darker than said calibrated image values in shadow and lower midtone regions, said filtered values being quantized on a filtered values scale having a maximum filtered value and more than two filtered scale levels;

means for mapping said filtered values for said pixels to printer values, said printer values being quantized on a printer values scale having more than two printer scale levels and a maximum printer value which differs from said maximum filtered value, differences between said filtered values and said printer values, as measured on said filtered values scale, being corrected such that a first spatial average over a region of said filtered values approximates a second spatial average over said region of said printer values, as measured on said filtered values scale;

means for defining dimensions of a multi-pixel cell of said pixels;

means for defining a set of font cells, each of said font cells having an arrangement of font pixel values for said pixels in said multi-pixel cell and a corresponding font index value;

means for mapping said printer values for said pixels in said multi-pixel cell to a corresponding one of said font cells, said printer engine printing said font pixel values for said corresponding one of said font cells in said multi-pixel cell on said printing surface; and means for dynamic range adjustment of a dynamic range of said font cells as printed by said printer engine to provide an extended dynamic range.

21. An apparatus for accurate reduced-resolution tone reproduction of a printed image based on an image of image values obtained via a scanner, said printed image being generated by a printer engine with a printer resolution which deposits a marking medium at pixels on a printing surface, an amount of said marking medium deposited at said pixels being a function of printer values for said pixels, comprising:

color matcher for calibrating printer colors generated by said printer engine with said image values obtained from said scanner to produce calibrated image values;

dot gain compensator for filtering said calibrated image values to provide filtered values lighter than said calibrated image values in highlight and upper midtone regions and darker than said calibrated image values in shadow and lower midtone regions, said filtered values being quantized on a filtered values scale having a maximum filtered value and more than two filtered scale levels;

halftoning unit for mapping said filtered values for said pixels to printer values, said printer values being quantized on a printer values scale having more than two printer scale levels and a maximum printer value which differs from said maximum filtered value, differences between said filtered values and said printer values, as measured on said filtered values scale, being corrected such that a first spatial average over a region of said filtered values approximates a second spatial average over said region of said printer values, as measured on said filtered values scale;

cell dimensions definition unit for defining dimensions of a multi-pixel cell of said pixels;

font cell generator for generating a set of font cells, each of said font cells having an arrangement of font pixel values for said pixels in said multi-pixel cell and a corresponding font index value;

halftone font indexer for mapping said printer values for said pixels in said multi-pixel cell to a corresponding one of said font cells, said printer engine printing said font pixel values for said corresponding one of said font cells in said multi-pixel cell on said printing surface; and dynamic range adjuster for dynamic range adjustment of a dynamic range of said font cells as printed by said printer engine to provide an extended dynamic range.

* * * * *